United States Patent [19]
Kishida et al.

[11] Patent Number: 5,802,475
[45] Date of Patent: Sep. 1, 1998

[54] MOBILE RADIO TELEPHONE APPARATUS

[75] Inventors: Toshihide Kishida; Hideaki Yui; Shigehiko Yazawa; Hideya Toyama, all of Kawasaki, Japan

[73] Assignee: Fujitsu Limited, Kawasaki, Japan

[21] Appl. No.: 339,296

[22] Filed: Nov. 10, 1994

Related U.S. Application Data

[63] Continuation of Ser. No. 895,129, Jun. 8, 1992, abandoned.

[30] Foreign Application Priority Data

Jun. 6, 1991 [JP] Japan .................... 3-134743
Mar. 16, 1992 [JP] Japan .................... 4-057898

[51] Int. Cl.$^6$ .................................................. H04Q 7/20
[52] U.S. Cl. .................................. 455/453; 455/511
[58] Field of Search ........................ 379/58, 59, 60, 379/61, 63; 455/33.1, 33.2, 56.1, 34.1, 403, 422, 435, 450, 452, 453, 511, 560

[56] References Cited

U.S. PATENT DOCUMENTS

| | | | |
|---|---|---|---|
| 3,898,390 | 8/1975 | Wells et al. ................ | 379/59 |
| 4,833,702 | 5/1989 | Shitara et al. .............. | 379/60 |
| 4,852,148 | 7/1989 | Shibata et al. ............. | 379/59 |
| 4,879,740 | 11/1989 | Nagashima et al. ......... | 379/60 X |
| 4,939,785 | 7/1990 | Murata et al. .............. | 379/61 X |
| 5,235,598 | 8/1993 | Sasuta ....................... | 455/34.1 X |
| 5,239,678 | 8/1993 | Grube et al. ................ | 455/34.1 |

FOREIGN PATENT DOCUMENTS

| | | |
|---|---|---|
| 21 058 223 | 9/1990 | Japan . |
| 21 58 223 | 9/1990 | Japan . |
| 22 099 390 | 2/1991 | Japan . |

OTHER PUBLICATIONS

Philips Telecommunication Review, vol. 42, No. 1, Apr., 1984, Hilversum NL, pp. 35–45, De Boer et al. 'The Trunking of Radio Channels in Private Mobile Radio Networks'.

Philips Telecommunication and Data Systems Review, vol. 47, No. 3, Sep., 1989, Hilversum NL, pp. 20–33, Davey et al., 'AMCON: Trunked Mobile Radio Communication in Band Three'.

Philips Telecommunication Review, vol. 42, No. 1, Apr. 1984, Hilversum HL, pp. 35–45; De Boer et al. 'The Trunking of Radio Channels in Private Mobile Radio Networks', p. 39, paragraph 7.

*Primary Examiner*—Dwayne Bost
*Assistant Examiner*—William G. Trost
*Attorney, Agent, or Firm*—Staas & Halsey

[57] ABSTRACT

A mobile radio telephone apparatus operating in a plurality of zones, where each user operates said apparatus from a mobile terminal in one of said zones. The apparatus comprises P number of mobile terminals in each zone, Q number of communications connecting devices in each zone, and a management connecting device in each zone for recognizing which zone a mobile terminal is located in. The mobile radio telephone apparatus also comprises a controlling unit for controlling the management connecting device so that it operates as an additional communications connecting device in one zone, if one of the P mobile terminals generates a connecting request in the one zone and all Q of the communications connecting devices are already assigned to the other P mobile terminals.

5 Claims, 33 Drawing Sheets

BS PACKAGING DIAGRAM

C-BS FREE/USED DIAGRAM

U-BS FREE/USED DIAGRAM

MOBILE TERMINAL POSITION DISPLAY DIAGRAM

CONTROL MODE DISPLAY DIAGRAM (BS PACKAGING DIAGRAM)

(C-BS FREE/USED DIAGRAM)

(MOBILE TERMINAL POSITION DISPLAY DIAGRAM)

(SPECIAL ZONE DISPLAY)
(CASE OF SYSTEM CORRESPONDENCE)

(SPECIAL ZONE DISPLAY)
(CASE OF MOBILE TERMINAL CORRESPONDENCE)

MOBILE RADIO TELEPHONE APPARATUS

This application is a continuation of application Ser. No. 07/895,129, filed on Jun. 8, 1992, now abandoned.

BACKGROUND OF THE INVENTION

1. Field of the Invention

This invention pertains to a radio telephone apparatus for accommodating a mobile terminal capable of moving between a plurality of radio zones, and more particularly, to a mode controlling system for a connecting device to be used by switching its mode.

2. Description of the Related Art

With the recent advances in the field of line switching exchangers, cordless terminals, i.e. mobile terminals, become more prevalent. Their applications to such new markets as hotels, hospitals, airports and amusement parks can be considered, in addition to such existing markets, such as offices.

For efficiency improvements in establishing communications channels and simplification in managing mobile terminals, a mobile radio telephone apparatus is known in which an area to be controlled is divided into a plurality of zones, and the presence of a mobile terminal is detected and managed and a call reception information is notified in each of the zones.

A line switching exchanger covers various kinds of areas allowing movement. There are such areas as offices which anticipate a constantly steady a flow of traffic. Also, there are such areas as warehouses, libraries, and equipment rooms having extremely low traffic, because these places usually see few people. Although it is necessary to provide a connecting device for establishing a radio zone in such low traffic areas in order to render them a part of areas allowing movement, the number of such connecting devices must be kept to a minimum from the cost consideration.

FIG. 1 (PRIOR ART) is a conventional system diagram. In FIG. 1, 11 is a device for controlling the system, such as a private branch exchanger (PBX). The PBX 11 connects with an extension line 12, an office trunk 13, and a plurality of management connecting devices (M-BS) 14 and a plurality of communications connecting devices (C-BS) 15. Each of plural zones (Z1 through Zn) split from the area to be managed by the radio exchanger has at least one each of the management connecting devices 14 and communications connecting devices 15. Various user conditions of the mobile radio telephone apparatus determine how an area of zone is designed and a number of units to be assigned to the area.

The management connecting devices 14 regularly radio the mobile terminal (PSk,q) 16 moving in from a foreign zone to its home zone and detect, as position information, a zone in which the mobile terminal 16 exists, and send the position information (a home zone number) to the PBX 11. Each of the communications connecting devices 15 establishes a wireless communications channel with any mobile terminal 16 in its home zone.

A reference to FIG. 2 (PRIOR ART) reveals that the PBX 11 comprises an exchange processor 21 for indigenous line switching, a channel controller 22 for wired communications with the management connecting devices 14 and the communications connecting devices 15, and a maintenance console 23 as an external device for inputting various data, and a console controller (CC) 33 for controlling the maintenance console 23.

The PBX 11 also comprises a BS assignment controller 24 for assigning (initializing) the corresponding one of the management connecting devices 14 and communications connecting device 15, a BS packaging table (memory) 25 and a BS initializer 26. The PBX 11 further comprises a mobile terminal position tracker 27 for tracking the position of the mobile terminal 16, a mobile terminal position display (memory) 28 and a telephone number—PS number correspondence table (memory) 29. The PBX 11 finally comprises a mobile terminal processor 30 for having the mobile terminal (PS) 16 receive a call, a C-BS free/used table (memory) 31 and a C-BS selector 32.

Each of the management connecting devices 14 comprises a wire interfacer 41 for wired communications with the PBX 11, a radio interfacer 42 for exchanging various information by wireless communications with the mobile terminal 16, a zone number display (memory) 43 with a home zone number set and a management processor 44 for tracking the location of the mobile terminals.

As with management connecting devices 14, the communications connecting devices 15 each have a wire interfacer 41, a radio interfacer 42, a zone number display (memory) 43 and a communications processor 45.

In FIG. 1, management connecting devices (M-BS1, 1 through M-BSk+1, 1) are assigned respectively to zones Z(1) through Z(k+1). Communications connecting device C-BS1, 2 is assigned to zone Z(1). Communications connecting devices C-BS2, 2 through C-BS2, 6 are assigned to zone Z(2). Communications connecting devices C-BSk, 2 through C-BSk, m+1 are assigned to zone Z(k). Communications connecting devices C-BSk+1, 2 through C-BSk+1, m+1 are assigned to zone Z(k+1). Each zone has at least one [1] communications connecting device corresponding to its traffic requirement. A process switcher selects either a management connecting device M-BS or a communications connecting device C-BS. A PBX 11 performs assignments to the switched systems. The following is a description of the assignment system for a management connecting system (M-BS) 14 and a communications connecting device (C-BS) 15.

A maintenance console 23 enables one [1] management connecting device (M-BS) 14 and a plurality of communications connecting devices (C-BS) 15 to be assigned to each zone, based on the system configuration shown in FIG. 1, which is designed by user traffic conditions and so forth.

The maintenance console 23 is a terminal for performing assignments. Data inputted via the maintenance console 23 are supplied through a console controller (CC) 33 to the PBX 11 and become commands for various settings.

In an assignment of management connecting device (M-BS) 14, a BS assignment controller 24 creates a BS packaging table 25 first, and a notification is made to a management connecting device (M-BS) 14 via a BS initializer 26 and a channel controller 22. The management connecting device (M-BS) 14 sets its home zone number in a zone number display (memory) 43 via a wire interfacer 41.

In an assignment of communications connecting device (C-BS) 15, a BS assignment controller 24 creates the BS packaging table 25 and a C-BS free/used table 31 first, and a notification is made to a communications connecting device (C-BS) 15 via the BS initializer 26 and the channel controller 22. The communications connecting device (C-BS) 15 sets its home zone number in the zone number display 43 via the wire interfacer 41.

A management system for position information of a mobile terminal is explained below.

A management connecting device (M-BS) 14 cyclically emits to a mobile terminal (PS) 16 in its home zone of the zones Z(1) through Z(k+1) its home zone number of the zone number display 43 by way of a radio interfacer 42. Upon its reception, the mobile terminal (PS) 16 notifies the management connecting device (M-BS) 14 of the movement information with its home PS number attached, if the hitherto recognized number of the zones Z(1) through Z(k+1) is different from the received number. On receiving the notification, the management connecting device (M-BS) 14 notifies the PBX 11 by way of the radio interfacer 42, the management processor 44 and the wire interfacer 41. The PBX 11 redirects the notification to a mobile terminal position tracker 27 by way of the channel controller 22. The mobile terminal position tracker 27 sets a mobile terminal position display 28, thereby completing the recognition of position information. Here, although the movement information from the mobile terminal (PS) 16 also reaches the communications connecting device (C-BS) 15, because the communications connecting device (C-BS) 15 does not select a management processor 44, the movement information is discarded.

As is evident from the above description, a conventional system for controlling mobile terminal connecting devices requires, for each of the zones Z(1) through Z(k+1), connecting devices exclusively for communications in a number commensurate with the traffic level, in addition to one [1] connecting device exclusively for managing the position information of a mobile terminal irrespective of the traffic level. Therefore, even a zone having a sufficiently low traffic level in which only one [1] may be connected at a particular point in time requires at least a total of two [2] connecting devices, comprised of one exclusively for communications and the other exclusively for management, which renders the system uneconomical in terms of the facilities cost.

On the other hand, when a mobile terminal moves from one zone to another, a management connecting device detects it, and notifies a system controlling device, thereby updating the information on the position of the mobile terminal.

Therefore, in a zone (special zone) where a large number of holders of mobile terminals move around during a certain peak period, such as a dining room, a hall, and a convention room, the management connecting device is temporality overloaded, and it takes much time for a system controlling device to complete recognizing the information on positions of all mobile terminals, during which period, the positions (zones) of mobile terminals recognized by the system controlling device are quite different than their actual positions (zones).

Hence, when there is a request for a call reception while the positions of the mobile terminals are managed, there are problematical cases in which the system controlling device recognizes position information of an old zone (a zone before moving), in which case no call reception consummation information is returned for the call reception information to the mobile terminal, which prevents a call from being connected.

SUMMARY OF THE INVENTION

This invention pertains to a usage system of a connecting system for a mobile radio telephone apparatus accommodating a mobile terminal movable among a plurality of radio zones. It aims first at economizing the equipment by temporarily using for communications a management connecting device for tracking the positions of mobile terminals to the extent without losing its indigenous function, and second at reducing the processing load for tracking the positions of mobile terminals and at ensuring secure call receptions.

This invention provides a unit for controlling such a management connecting device as a management/communications common connecting device, which operates in a management mode as long as the zone has a free communications connecting device. It also operates in a communications mode when all communications connecting devices in the zone are used and a request is made for an additional call connection. When a mobile terminal moves to a generic zone, the register unit registers the position information from a management unit to a first memory unit. When a mobile terminal moves to a special zone, a selection unit stops this. When a request for a call reception is made, a call reception control unit invokes communications units for managing respective zones registered in the first memory unit and the second memory unit.

BRIEF DESCRIPTION OF THE DRAWINGS

One of skill in the art can easily understand additional features and objects of this invention from the description of the preferred embodiments and some of the attached drawings. In the drawings:

FIG. 18 shows internal connections of the management connecting device (M-BS) 81, when the flag set in its process selector 84 is on;

FIG. 19 shows internal connections of the management/communications common connecting device (U-BS) 82, when the flag set in its process selector 84 is on;

DETAILED DESCRIPTION OF THE PREFERRED EMBODIMENTS

Figure 3:
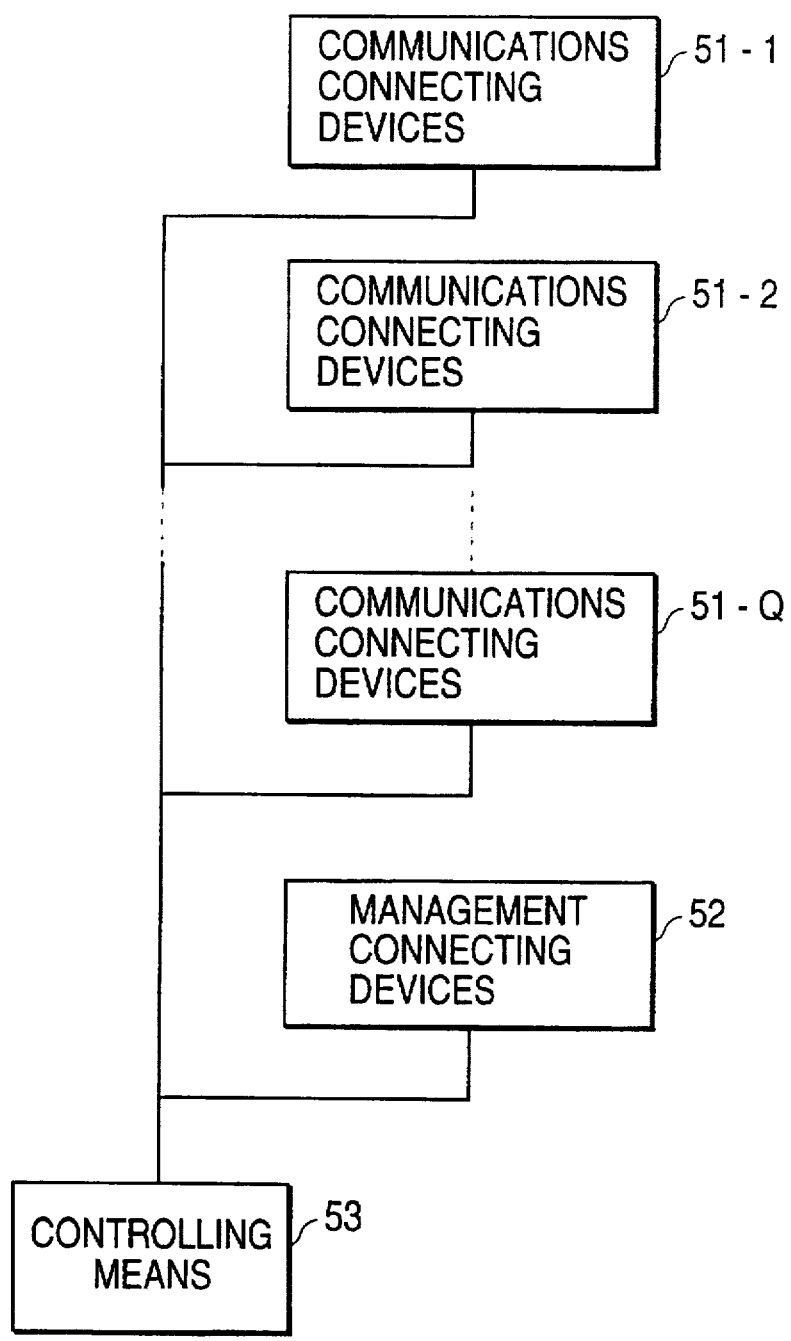
FIG. 3 is a block diagram showing a first principle of this invention.

FIG. 3 is a block diagram showing a first principle of this invention.

A first principle of this invention applies for a cellular telephone system in which a zone has mobile terminals and communications connecting devices 51-1 through 51-Q in a P:Q ratio and a management connecting device for tracking the positions of the mobile terminals.

Communications connecting devices 51-1 through 51-Q perform data communications with mobile terminals in wireless connections. They become management connecting devices on receiving an instruction from a controlling unit 53.

A management connecting device 52 manages at least the position information of the mobile terminals. It becomes a communications connecting device on receiving a request from the controlling unit 53.

The controlling unit 53 has the management connecting device operate as a communications connecting device, when all Q of the communications connecting devices are assigned to mobile terminals, and if a request is made for a connection with another mobile terminal. The controlling unit 53 designates as the management connecting device the one of the now Q+1 communications connecting devices that consummates its communications.

On receiving a request for connection from another mobile terminal when the communications connecting devices 51-1 through 51-Q are all assigned to respective mobile terminals (PS) 16, the controlling unit 53 has the management connecting device 52 operate as an extra communications connecting device. The management connecting device 52 and the communications connecting devices 51-1 through 51-Q can respectively select their functions between management and communications, and operate for either in response to a request. This enables one more channel to be used, if all the communications connecting devices are being used.

Figure 4:
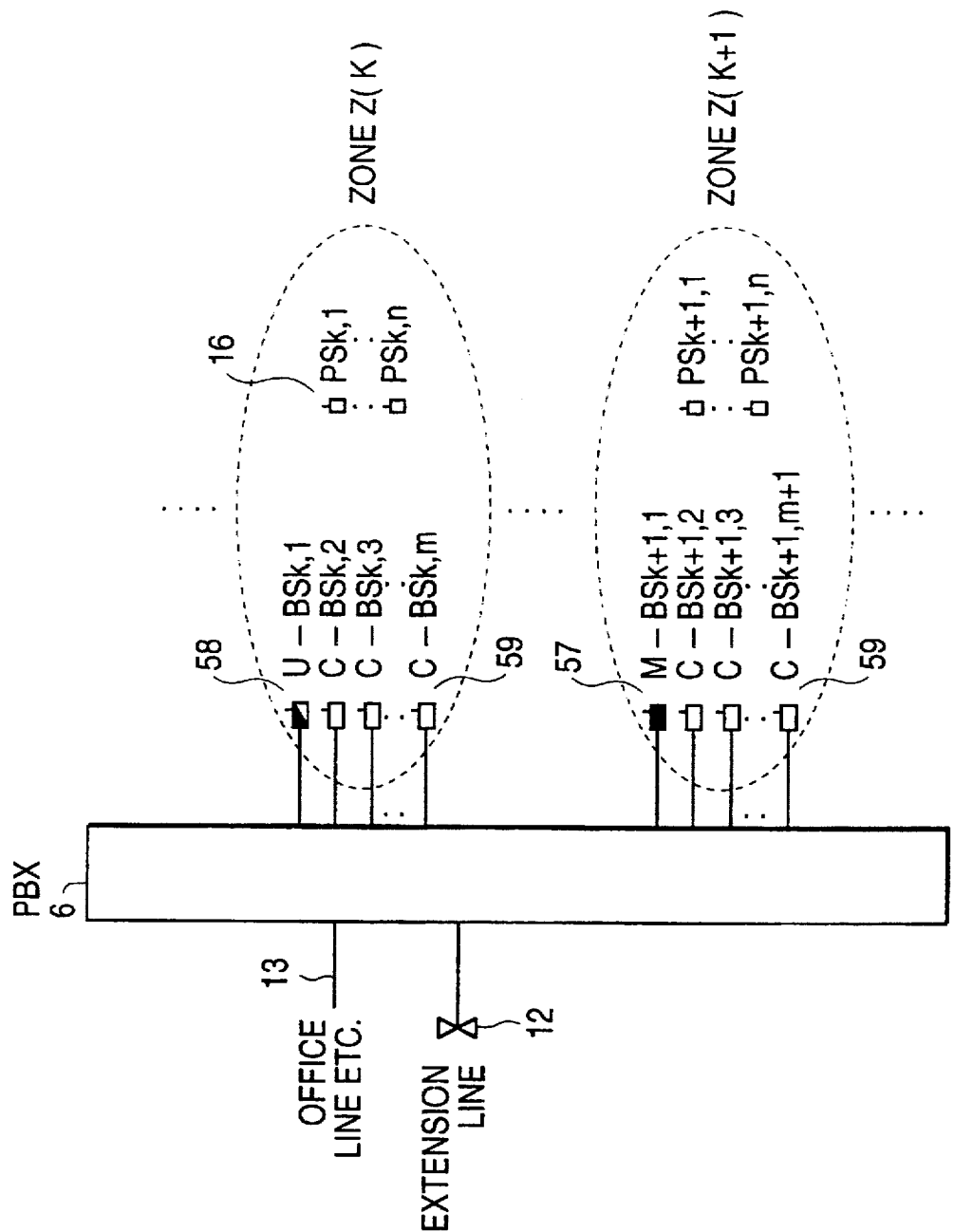
FIG. 4 is a system diagram of this invention.
Figure 5:
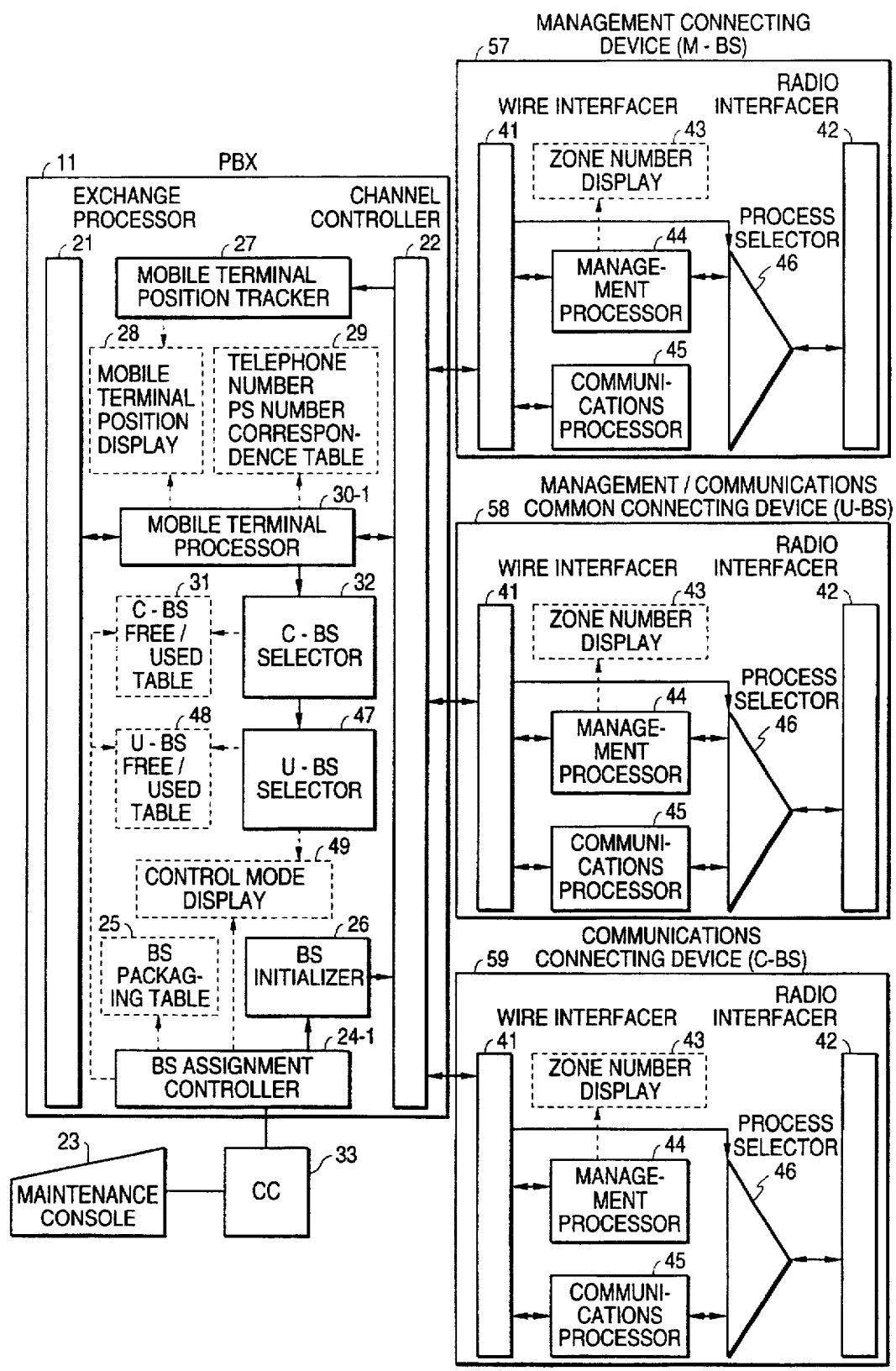
FIG. 5 is a block diagram of the basic system in a first embodiment of this invention.

FIG. 4 is a system diagram of this invention, and FIG. 5 is a block diagram of the basic system in a first embodiment of this invention.

FIG. 4 is a diagram showing a system in which a management/communications common mode is applied to zone Z(k) by providing a management/communications common connecting device (U-BS) 58, and an exclusive management mode is applied to zone Z(k+1) by providing a management connecting device (M-BS) 57. In FIG. 4, 59 is a communications connecting device (C-BS) and 16 is a mobile terminal.

An embodiment of this invention is made such that there are only one [1] type of connecting devices with respect to their configurations, which are used in three [3] different ways by their usage modes, i.e. for management, commonly for management/communications and for communications.

FIG. 5 is a block diagram of the basic system in the first embodiment of this invention.

The first embodiment of this invention provides, as its elements, a U-BS selector 47, a U-BS free/used table 48, a control mode display 49 and a process selector 46. The process selector 46 selects for operation either the management processor 44 or the communications processor 45. The U-BS selector 47 and the U-BS free/used table 48 performs a control for using the management/communications common connecting device (U-BS) 58 for communications. The control mode display 49 keeps track of the position of a mobile terminal, as long as there is a free connecting device. The U-BS free/used table 48 and the control mode display 49 are zone-specific, thereby optimizing the economy and serviceability of equipment as a system.

The process selector 46 provided for each connecting device selects for operation either the management processor 44 or the communications processor 45 by a control signal supplied from the channel controller 22 via the wire interfacer 41, and becomes a management connecting device (M-BS) 57, a management/communications common connecting device (U-BS) 58 or a communications connecting device (C-BS) 59. The U-BS selector 47 and the U-BS free/used table 48 provided in the PBX 11 toggle for communications the management/communications common connecting device (U-BS) 58, when the communications connecting devices (C-BS) 59 are all being used. The control mode display 49 provided in the PBX 11 promptly resumes the management function by making initially released connecting device as a new management/communications common connecting device (U-BS), when the connecting devices are all being used for communications, i.e. when the later described management function is suspended. By providing the U-BS free/used table 48 and the control mode display 49 (each comprising a memory) for each zone, the earlier described functions are selected zone-specifically.

The embodiment of this invention is described below in a sequence comprised of (1) an assignment of connecting device, (2) a management of position information of a mobile terminal, (3) a selection of a connecting device, and (4) a release of a connecting device.

Figure 6:
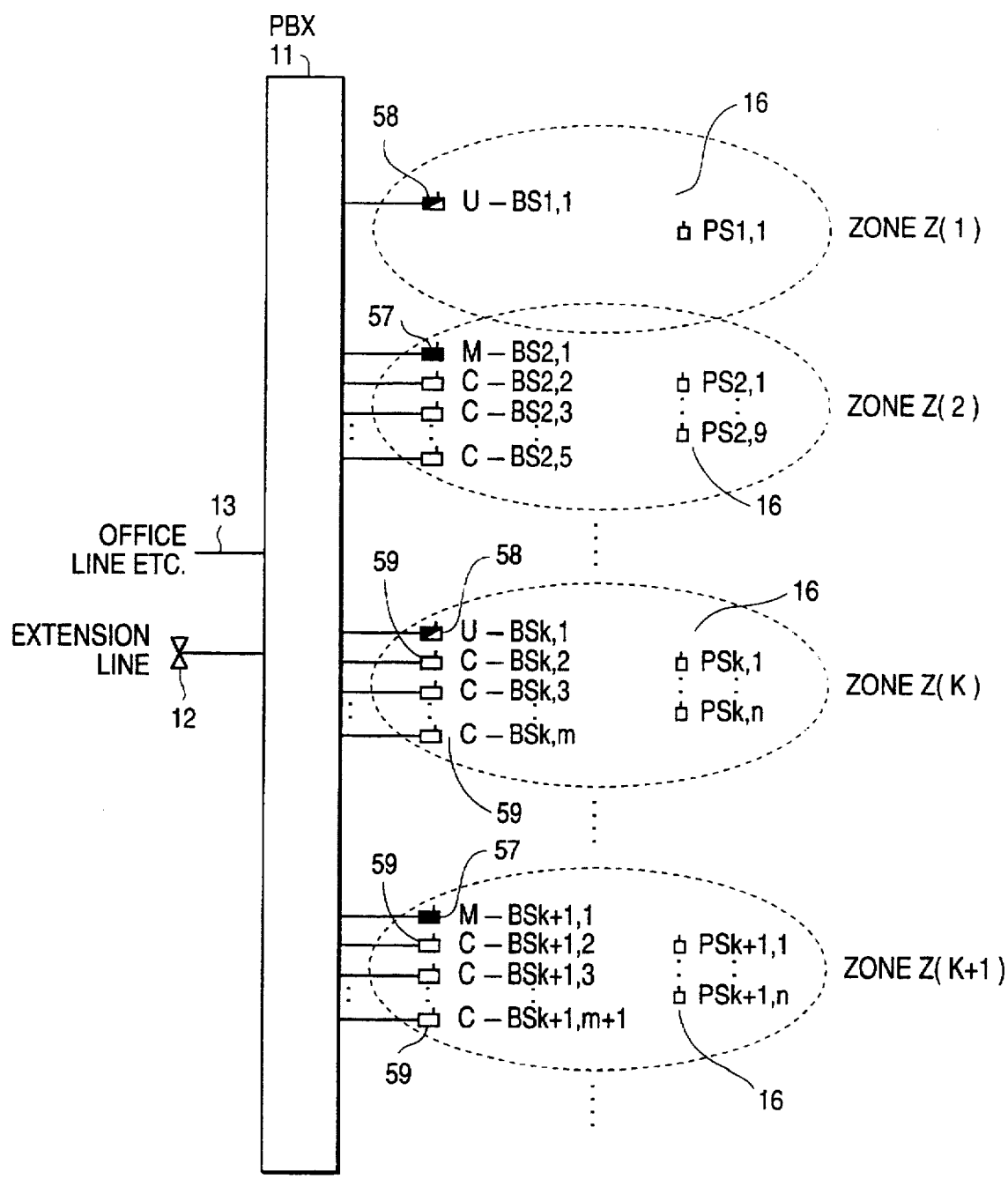
FIG. 6 is a system diagram of a second embodiment.

(1) an assignment of a connecting device:

FIG. 6 is a system diagram of a second embodiment. A maintenance console 23 enables at least one each of the management/communications common connecting devices (U-BS) 58 and the communications connecting devices (C-BS) 59 to be assigned to zones Z(1) and Z(k), as well as at least one each of the management connecting devices (M-BS) 57 and communications connecting devices (C-BS) 59 to zones Z(2) and Z(k+1).

First, when the management/communications common connecting devices (U-BS) 58 are assigned to zones Z(1) and Z(k), a BS assignment controller 24-1 sets a BS packaging table 25, in addition to the U-BS free/used table 48 and the control mode display 49. The BS assignment controller 24-1 invokes a BS initializer 26 and notifies the management/communications common connecting devices (U-BS) 58 by way of the channel controller 22. The management/communications common connecting devices (U-BS) 58 set their home zone numbers in a zone number display 43 by way of a wire interfacer 41, and controls the process selector 46 for having it selectively operate either the management processor 44 or the communications processor 45.

Second, when the management connecting devices (M-BS) 57 are assigned to zones Z(2) and Z(k+1), a BS assignment controller 24-1 sets the BS packaging table 25, in addition to the control mode display 49. The BS assignment controller 24-1 invokes the BS initializer 26 and notifies the management connecting devices (M-BS) 57 by way of the channel controller 22. The management connecting devices (M-BS) 57 set their home zone numbers in the zone number display 43 by way of the wire interfacer 41, control the process selector 46 for having it select only the management processor 44, and then become management connecting devices (M-BS) 57.

Lastly, when the communications connecting devices (C-BS) 59 are assigned to respective zones, the BS assignment controller 24-1 sets the BS packaging table 25, in addition to the C-BS free/used table 31 and the control mode display 49. The BS assignment controller 24-1 invokes the BS initializer 26 and notifies the communications connecting devices (C-BS) 59 by way of the channel controller 22. The communications connecting devices (C-BS) 59 set their home zone numbers in a zone number display 43 by way of the wire interfacer 41, and have the process selector 46 select only the communications processor 45. After making this selection control, it becomes a communications connecting device (C-BS) 59.

(2) a management of position information of a mobile terminal:

Since the management/communications common connecting devices (U-BS) 58 in zones Z(1) and Z(k) can also be selected for communications as described later, their management functions may be suspended. The management/communications common connecting devices (U-BS) 58 and the management connecting devices (M-BS) 57 in respective zones operate the same way as the conventional ones, except this point.

(3) a selection of a connecting device:

First, a case is explained in which the mobile terminal (PS) 16 originates a call.

In zones Z(1) and Z(k), all the free communications connecting devices (C-BS) 59 and all the free management/communications common connecting devices (U-BS) 58 receive call origination information from the mobile terminal (PS) 16, and respectively notify the PBX 11, by way of the radio interfacer 42, the communications processor 45 (or the management processor 44) and the wire interfacer 41, of a call origination request. When there are a plurality of call origination requests, the PBX 11 supplies their signals to the C-BS selector 32 by way of the channel controller 22 and the mobile terminal processor 30-1. The C-BS selector 32 refers to the C-BS free/used table 31 and selects one of the communications connecting devices (C-BS) 59 that makes a call origination request and remains free. If the communications connecting devices (C-BS) 59 are all being used, the U-BS selector 47 refers to the control mode display 49 and the U-BS free/used table 48, and selects the particular one of the management/communications common connecting devices (U-BS) 58. Further, thereafter, the PBX 11 changes the BS packaging table 25 such that the management/communications common connecting devices (U-BS) are made to the communications connecting devices (C-BS), and notifies the particular one of the management/communications common connecting devices (U-BS) 58 by way of the channel controller 22. On receiving the notification, the particular one of the management/communications common connecting devices (U-BS) 58 invokes the process selector 46 by way of the wire interfacer 41, selects only the communications processor 45, and thereafter operates as communications connecting devices (C-BS).

In this state, the management function in the zone is temporarily suspended.

Whereas, in zones Z(2) and Z(k+1), the management connecting devices (M-BS) 57 of theirs select only the management processor 44, these management connecting devices (M-BS) 57 cannot be selected for communications. As with a convention, when all the communications connecting devices (C-BS) 59 in a particular zone are being used, a call origination request is blocked for continuing the management function. The block processing during this period is performed by sending a busy tone to the person requesting a call origination.

A call reception at the mobile terminal (PS) 16 is explained.

Whereas, in zones Z(1) and Z(k), the selecting condition of a call origination is that there is a call origination request and the mobile terminal (PS) 16 is free, the selecting condition of a call reception is only that the mobile terminal (PS) 16 is free. With the exception of the difference in the selecting conditions, the mobile terminal (PS) 16 operates in a call reception in the same manner as in a call origination.

Whereas, in zones Z(2) and Z(k+1), the control mode display 49 does not invoke the U-BS selector 47, their management connecting devices (M-BS) 57 cannot be selected for communications. As with a convention, when all the communications connecting devices (C-BS) 59 in these zones are being used, a request for call reception is blocked for continuing the management function. The block processing during this period is performed by sending a busy tone to the person requesting a call origination.

(4) a release of a connecting device:

Whereas, in zones Z(1) and Z(k), the C-BS selector 32 refers to the control mode display 49 via the U-BS selector 47, and recognizes that their zone control mode is the management/communications common mode and that their management/communications common connecting devices (U-BS) 58 are selected for communications by referring to the U-BS free/used table 48, i.e. that it is first freed from among all the connecting devices in these zones, thereby releasing the freed one of the communications connecting devices (C-BS) 59 as a new addition to the management/communications common connecting devices (U-BS) 58. That is, the C-BS selector 32 changes the setting of the U-BS free/used table 48 and the BS packaging table 25, notifies the to-be-freed ones of the communications connecting devices (C-BS) 59 by way of the channel controller 22. These communications connecting devices (C-BS) 59 invoke the process selector 46 by way of the wire interfacer 41, select both the management processor 44 and the communications processor 45, and thereafter operates as the management/ communications common connecting devices (U-BS) 58.

Whereas, in zones Z(2) and Z(k+1), the C-BS selector 32 refers to the control mode display 49, and recognizes that their zone control mode is the exclusive management mode. As with a convention, the C-BS selector 32 completes the releasing by changing the setting of the C-BS free/used table 31.

Figure 7:
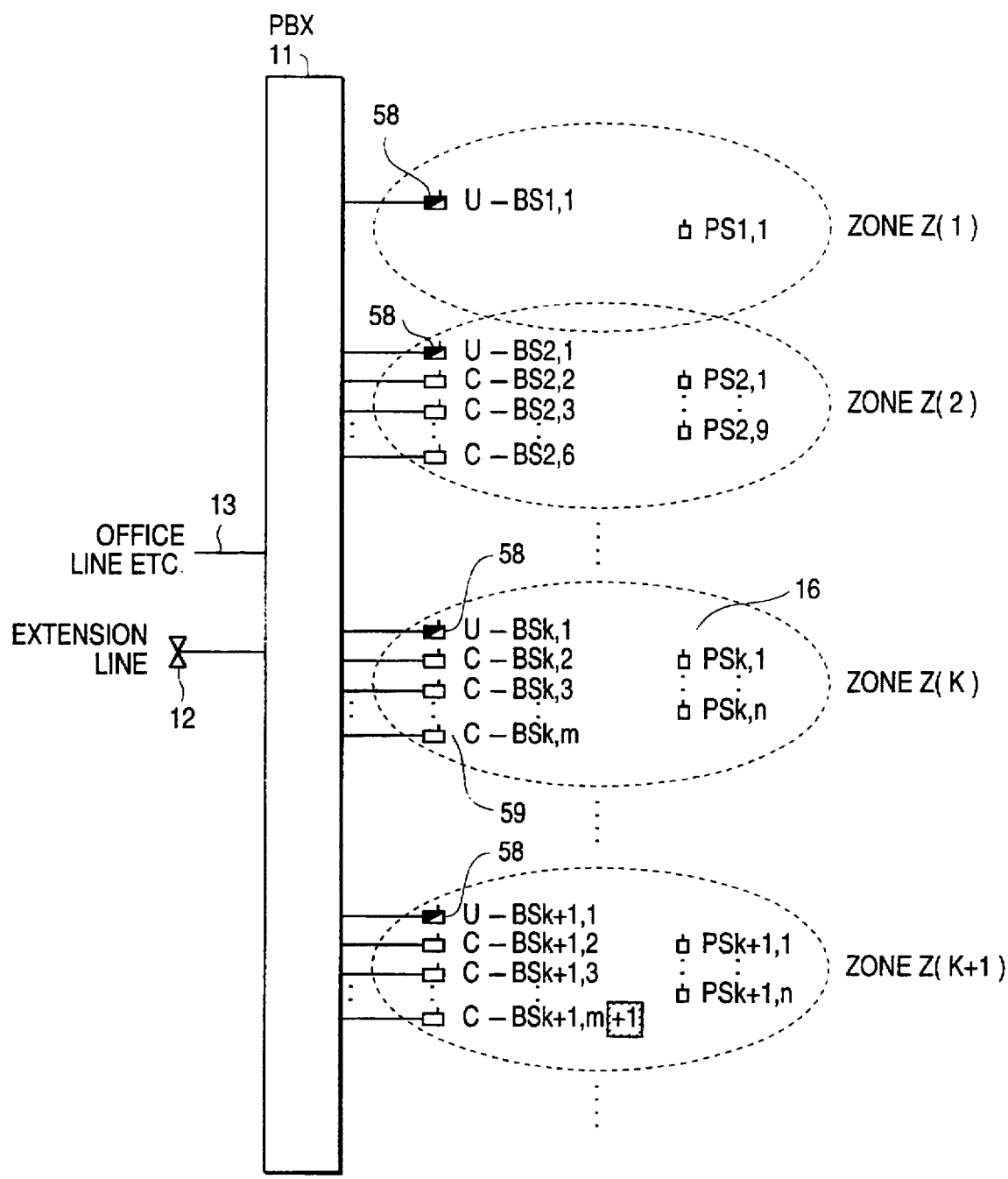
FIG. 7 is a system diagram of a third embodiment.

So far, an example shown in FIG. 6 is explained where a system configuration utilizing zones of both the exclusive management mode and the management/communications common mode, it is also possible to configure this system as in a third embodiment (Refer to FIG. 7.) in which all zones are of the management/communications common mode. The third embodiment enables communications in each zone to be performed in as many number of channels as the number of communications connecting devices (C-BS) 59 plus one [1].

It goes without saying that it is also possible to use a conventional system structure, i.e. a system structure in which all zones are of the exclusive management mode, instead of a conventional system configuration.

Figure 8:
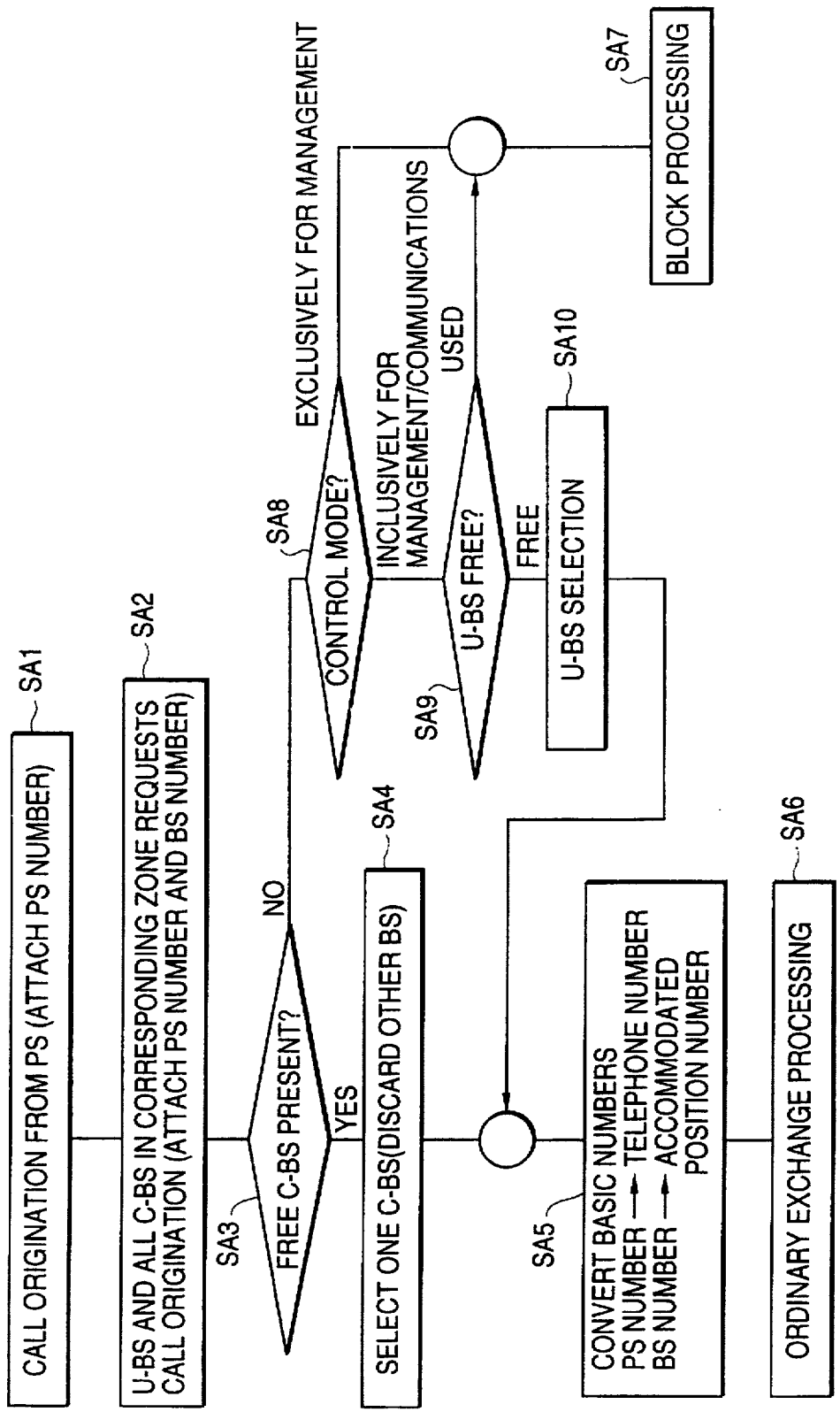
FIG. 8 is a flowchart for a control of a call origination in the first, second and third embodiments of this invention.

FIG. 8 is a flowchart for a control of a call origination in the first, second and third embodiments of this invention. The control of this embodiment is the same as the control of a conventional call origination.

Described below with a reference to FIG. 8 is a selecting system of a connecting device during a call origination. First, in step SA1, the mobile terminal (PS) 16 notifies the communications connecting device (C-BS) 59 of call origination information with its home PS number attached. Second, in step SA2, all receivable (i.e. free) communications connecting devices (C-BS) 59 notifies the PBX 11 by way of the radio interfacer 42, the communications processor 45 and the wire interfacer 41. That is, all the communications connecting devices (C-BS) 59 in a corresponding zone send a call origination request to the PBX 11.

Third, it is judged in step SA3 whether or not any communications connecting device (C-BS) is currently unused, i.e. free. When there is a free communications connecting device, the PBX 11 supplies plural call origination requests to the C-BS selector 32 by way of the channel controller 22 and the mobile terminal processor 30-1. Fourth, in step SA4, the C-BS selector 32 refers to the C-BS free/used table 31 and selects one [1] of the free communications connecting devices (C-BS) 59. The reason why the PBX 11 checks these communications connecting devices (C-BS) 59 are free, in response to call origination requests from a plurality of free communications connecting devices (C-BS) 59, is for preventing call receptions at the mobile terminal (PS) 16 from interfering with each other. The mobile terminal processor 30-1 discards a call origination request from other ones of the communications connecting devices (C-BS) 59 which are not selected. The mobile terminal processor 30-1 refers to the PS number—telephone number correspondence table 29 and the BS packaging table 25, converts the received PS number and the selected BS number to a telephone number and an accommodating position number for use in an ordinary switching operation, and invokes the exchange processor 21 in step SA5. Thereafter, a connection is processed in step SA6 as in a generic telephone terminal.

However, the first, second and third embodiments of this invention are different at a time when none of the communications connecting devices (C-BS) 59 is free. It is judged whether or not a connecting device operating for management is exclusively for management or commonly for management/communications in step SA8. If it is judged in step SA8 to be exclusively for management, a block processing in step SA7 is performed as with a convention. If it is judged to be commonly for management/communications, a judgment is rendered in step SA9 whether or not any of the management/communications common connecting devices (U-BS) 58 is free. When none of the management/ communications common connecting devices (U-BS) 58 is judged to be free, i.e. when all of them have been used, no communications link can be established, thereby performing block processing in step SA7. When, on the other hand, it is judged that one of the management/communications common connecting devices (U-BS) 58 is free, the processing in step SA5 is reexecuted after performing U-BS selection processing in step SA10.

Conventionally, a communications channel has been established only when any of the communications connecting devices (C-BS) 59 is free, since one of the management/ communications common connecting devices (U-BS) 58 is used as a communications channel, one [1] connecting device can be saved, or alternatively one [1] more channel can be established. This is also the case when calls are received.

Figure 9:
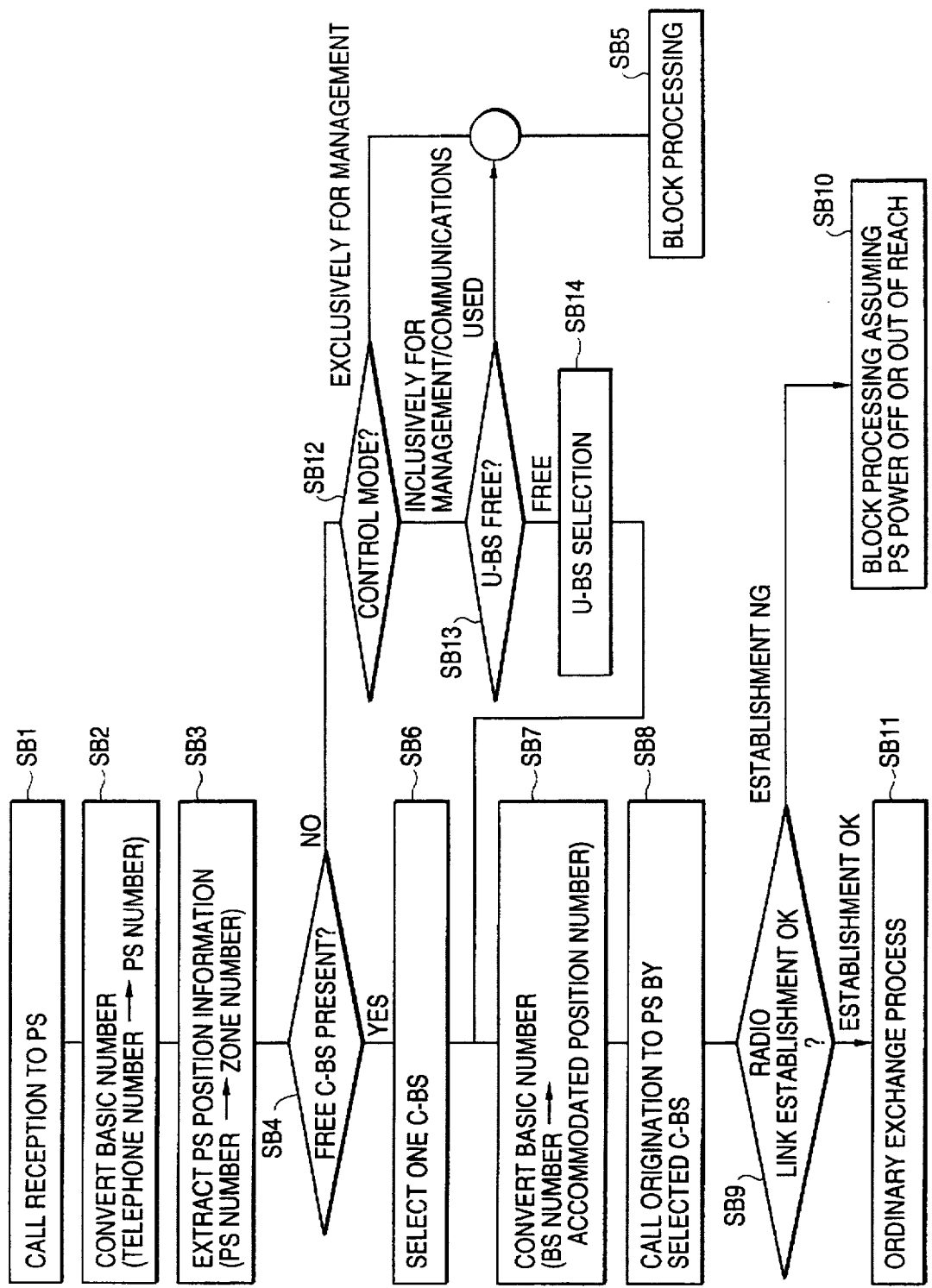
FIG. 9 is a flowchart showing processes at a call reception in the first, second and third embodiments of this invention.

FIG. 9 is a flowchart for a control of call reception in the first, second and third embodiments of this invention. Processings at a call reception are the same as convention.

When the exchange processor 21 detects a request for call reception to a mobile terminal 16 in step SB1, the calling terminal sends a telephone number of the connectee to the mobile terminal processor 30-1. The mobile terminal processor 30-1 extracts the PS number corresponding to the telephone number from the PS number correspondence— telephone number table 29 in step SB2, and the zone number corresponding to the PS number from the mobile terminal position display 28 in step SB3.

Then, the mobile terminal processor 30-1 invokes the C-BS selector 32 for judging whether or not any of the communications connecting devices (C-BS) 59 in charge of the corresponding zone is free in step SB4.

If something is free in step SB4, it selects one of them in step SB6, and extracts the accommodated position number from the selected BS number (identification number preassigned to the particular one of the communications connecting devices (C-BS) 59) by referring to the C-BS free/used table 31 in step SB7 and notifies the mobile terminal processor 30-1.

In step SB8, the mobile terminal processor 30-1 emits call reception information including the PS number to the selected one of the communications connecting devices (C-BS) 59, and the received one of communications connecting devices (C-BS) 59 emits the call reception information to the corresponding mobile terminal 16.

The mobile terminal 16 receiving the call reception information whose preassigned PS number matches the PS number included in the call reception information returns the reception consummation information to the corresponding one of the communications connecting devices (C-BS) 59. Because a return establishes a radio link (communications channel), it judges in step SB9 the presence or absence of a return (i.e. whether or not a radio link is established). When no radio link is established (in case of an establishment being NG), it performs a block processing by assuming that the corresponding mobile terminal 16 has its power off or does not exist in the particular zone in step SB10. When the radio link is established, (i.e. in case of an establishment being OK,) an ordinary exchange is performed in step SB11, and the call reception at the mobile terminal 16 is consummated.

However, the control is different when in step SB4 it is judged none (NO) of the communications connecting devices (C-BS) 59 is free. In this case, it is first judged whether the zone control mode is exclusively for management or commonly for management/communications in step SB12. If the zone control mode is exclusively for management, the block processing in step SB5 is executed. If the zone control mode is commonly for management/communications, it is judged in step SB13 whether any of the management/communications connecting devices (U-BS) 58 is free in step SB13. If none of the management/communications connecting devices (U-BS) 58 is free, i.e. all are being used, the block processing in step SB5 is executed. If one is free, a selection is made and the processing in step SB7 is executed. Because a convention does not execute these processes at a call origination or at a call reception or equip the PBX 11 with a unit for managing connecting devices, a management connecting device cannot have been used for communications. Yet, this invention has an effect equivalent to increasing one [1] channel by using a management connecting device as a communications connecting device when all of the communications connecting devices are being used.

FIGS. 10A through 10E show data configurations for use in the first, second and third embodiments of this invention.

Figure 10A:
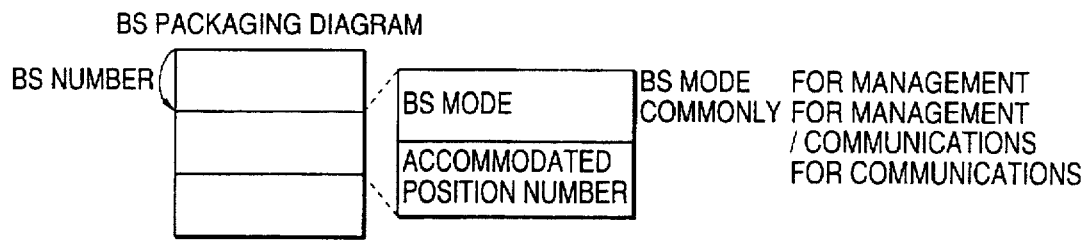
FIGS. 10A through 10E show data configurations for use in the first, second and third embodiments of this invention.

FIG. 10A is a BS packaging diagram, in which a BS mode and the number of an accommodating position, i.e. a zone, is managed for respective BS numbers. The BS mode indicates whether a connecting device is only for management, commonly for management/communications or only for communications.

Figure 10B:
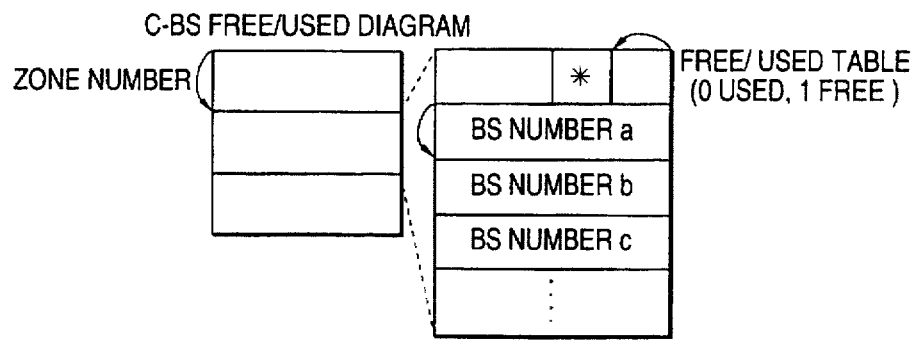

FIG. 10B is a C-BS free/used diagram. In correspondence with a zone number, it is stored whether or not any of the communications connecting device (C-BS) 59 is free or being used for each BS number. This is managed in zone units. A free/used bit is provided at the position at which a corresponding BS number is stored, thereby indicating a distinction between being free and being used.

Figure 10C:
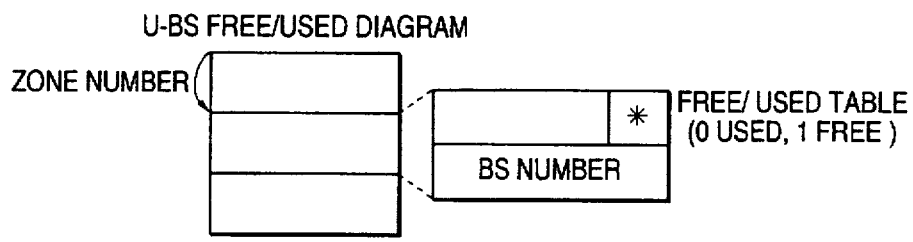

FIG. 10C is a U-BS free/used diagram. In correspondence with a zone number, it manages whether or not the management/communications connecting device (M-BS) 58 is free or being used for each BS number.

Figure 10D:
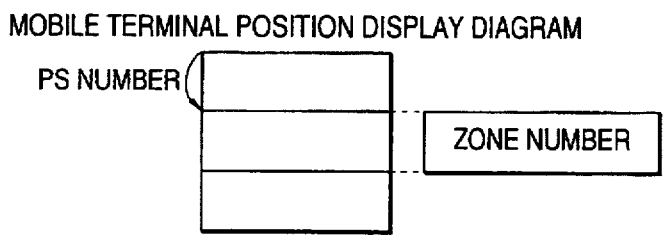

FIG. 10D is a mobile terminal position display diagram. The current position of a mobile terminal corresponding to a BS number is stored for each zone number.

Figure 10E:
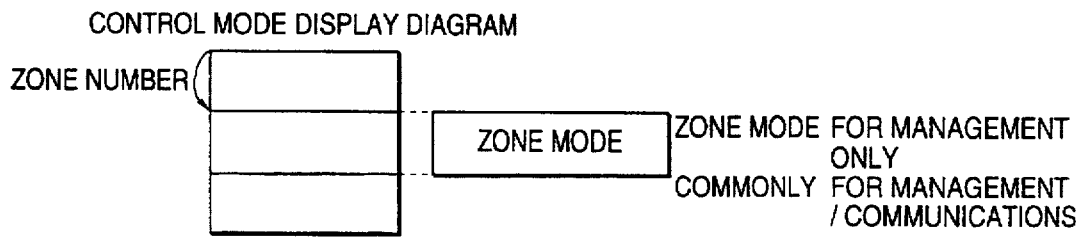

FIG. 10E is a control mode display diagram. It is stored whether the zone mode of a zone having a particular zone number is exclusively for management or commonly for management/communications. If a zone control mode shows a zone is exclusively for management, the processings in steps SA8 and SB12 shown respectively in FIGS. 8 and 9 judge that the zone is exclusively for management, and block processings are performed.

Figure 11:
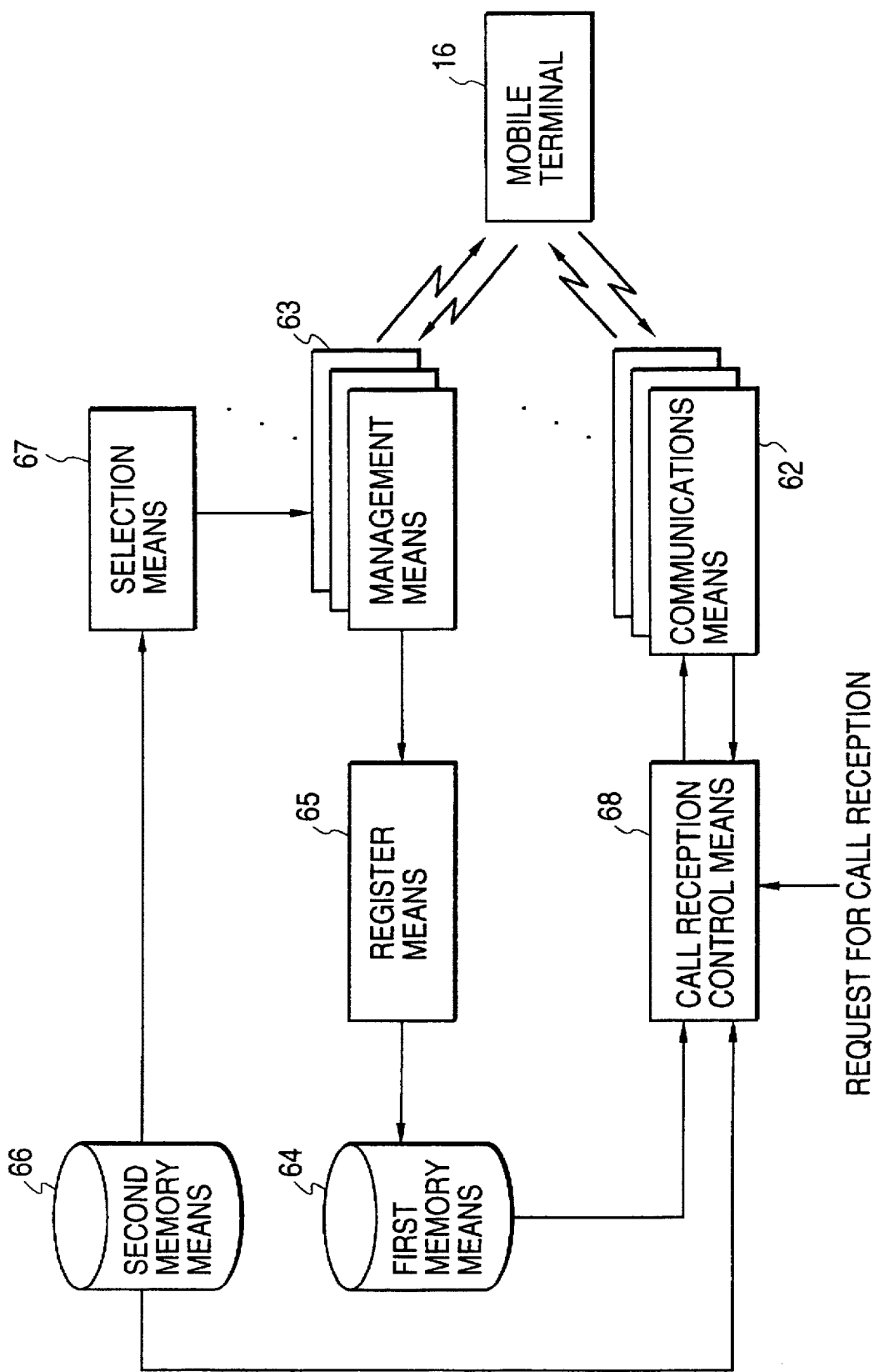
FIG. 11 is a block diagram showing a second principle of this invention.

FIG. 11 is a block diagram showing a second principle of this invention.

A mobile radio telephone apparatus is assigned to each of a plurality of zones pursuant to their purposes. It comprises communications unit 62, for establishing a wireless communications channel with a mobile terminal 16 within an assigned zone, management unit 63, assigned respectively to a plurality of zones, for regularly radioing a mobile terminal 16 moving from a foreign zone to an assigned zone and for emitting position information indicating the zone in which the mobile terminal 16 exits, a first memory unit 64 registering the position information, and a register unit 65 for registering the position information in the first memory unit 64.

The mobile radio telephone apparatus further comprises a second memory unit 66 preregistering as a special zone at least one [1] of all zones, a selection unit 67 for selectively terminating an output of the position information to the register unit 65 from the management unit 63 in charge of the special zone registered in the second memory unit 66, and a call reception control unit 68 for executing a first process of instructing the communications unit 62 in charge of a zone corresponding to the position information in the first memory unit 64 about the mobile terminal 16 to be called to emit call reception information and a second process of instructing the communications unit 62 in charge of the special zone registered in the second memory unit 66 to emit call reception information.

Zones other than the special zone registered in the second memory unit 66 is explained as generic zones.

When a mobile terminal 16 moves from another zone to a generic zone, the management unit 63 in charge of a new zone (a destined zone) recognizes it by radio and emits position information to a register unit 65, which registers it in the first memory unit 64. When the mobile terminal 16 has a request for call reception, the call reception control unit 68 performs only the first process.

When a mobile terminal 16 moves from another zone to a special zone, the management unit 63 in charge of a new zone (a zone at the destination) recognizes it by radio. However, since the second memory unit 66 registers this zone as a special zone, the selection unit 67 does not allow the management unit 63 to emit position information to a register unit 65. Thus, the first memory unit 64 still registers the position information of the old zone (an original zone).

When the mobile terminal 16 has a request for call reception, the call reception control unit 68 executes the first and second processes. In this case, if the mobile terminal 16 has moved to a special zone, the second process, not the first process, establishes a communications channel.

Accordingly, even when mobile terminals 16 have moved to a special zone in concentration, the management unit 63 does not emit position information to the register unit 65. Also, the various processes necessary for communications by the management unit 63 and the register unit 65, as well as some other processes by the register unit 65, are omitted, which prevents the processing load related to the position management of the mobile terminal to increase dramatically and ensures a proper call connection.

The following is a description of a fourth embodiment of this invention with reference to drawings.

Figure 12:
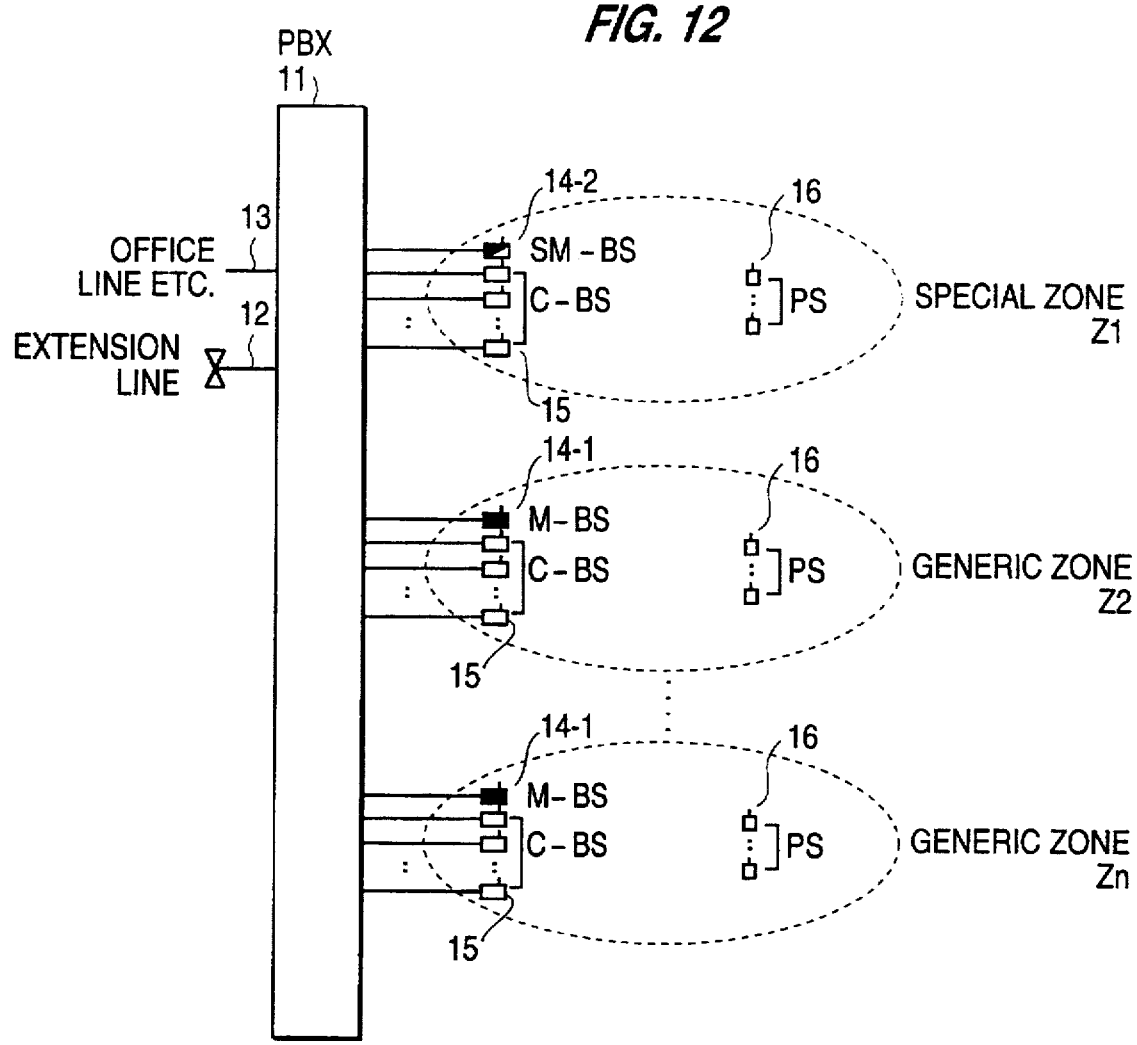
FIG. 12 is a diagram showing a system configuration in a fourth embodiment of this invention.

FIG. 12 shows a system configuration of a mobile radio telephone apparatus in a fourth embodiment of this invention.

Figure 13:
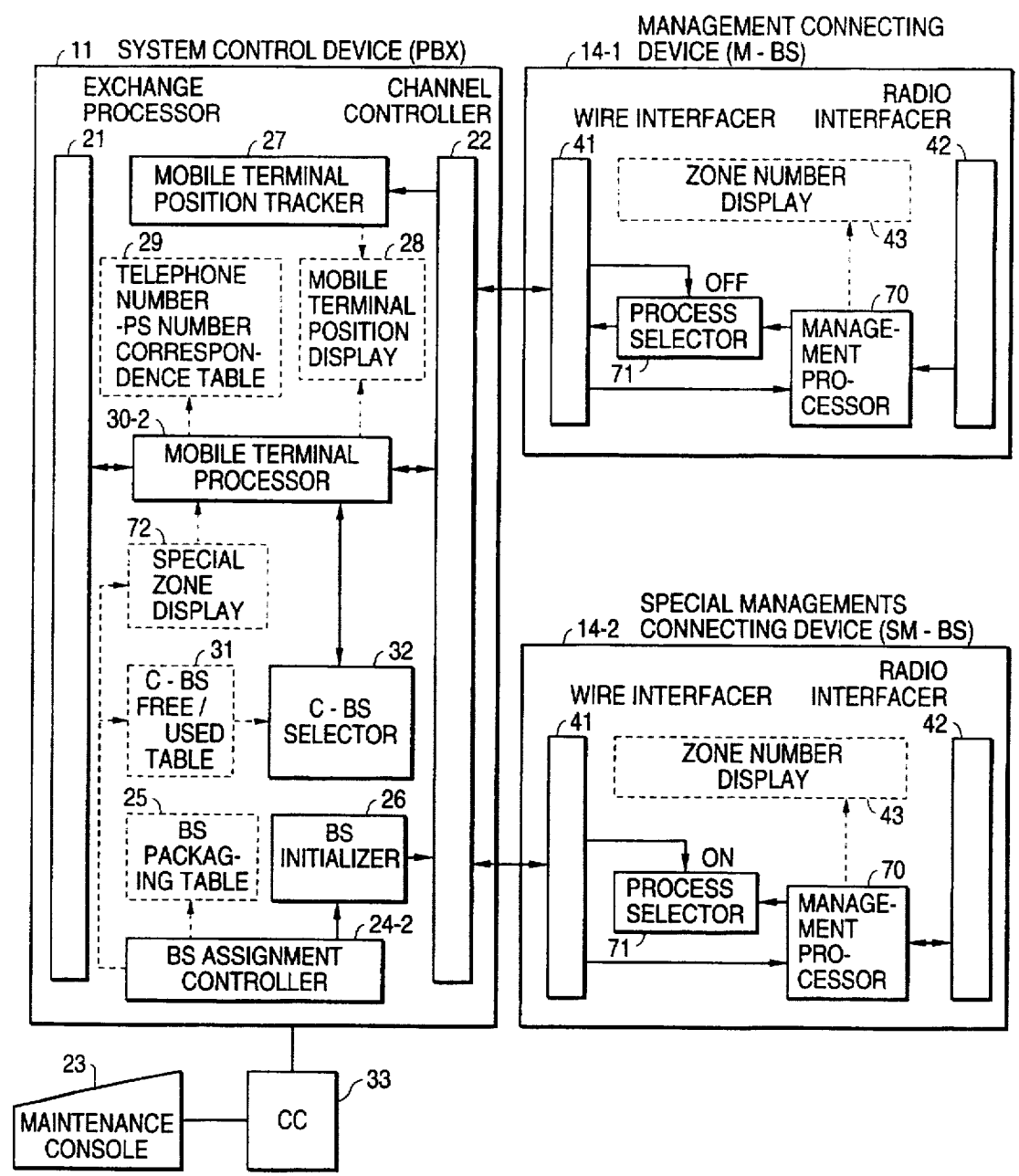
FIG. 13 is a block diagram showing a functional configuration of the fourth embodiment of this invention.

FIG. 13 is a block diagram showing the functional configuration in the fourth embodiment of this invention.

Figure 14A:
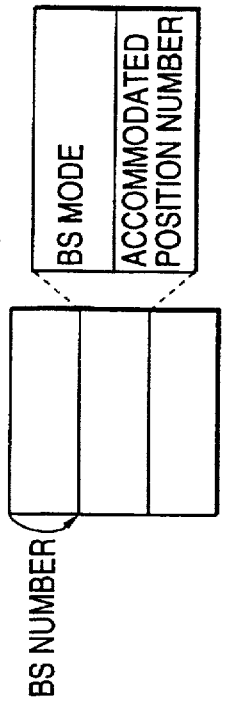
FIGS. 14A, 14B and 14C are diagrams showing data configurations of a BS packaging table, a C-BS free/used table and a mobile terminal position display 28 for use in the fourth embodiment of this invention.
Figure 14B:
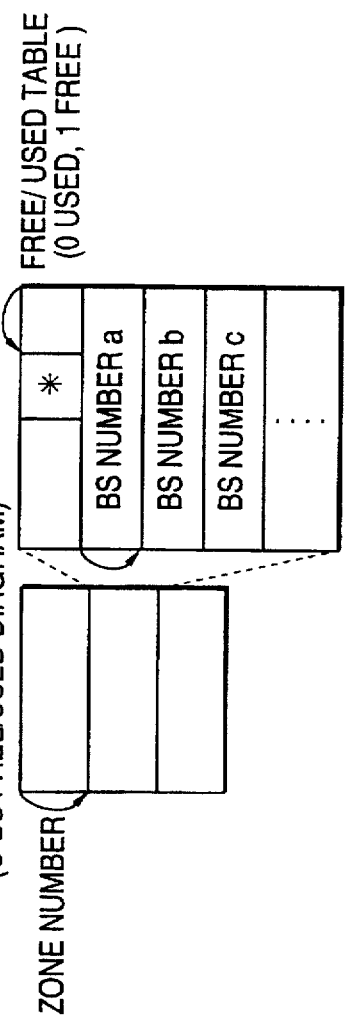
Figure 14C:
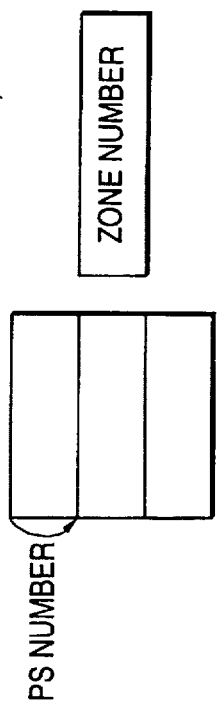

FIGS. 14A, 14B and 14C show data configurations in a BS packaging table, C-BS free/used table and a mobile terminal position display.

Figure 15A:
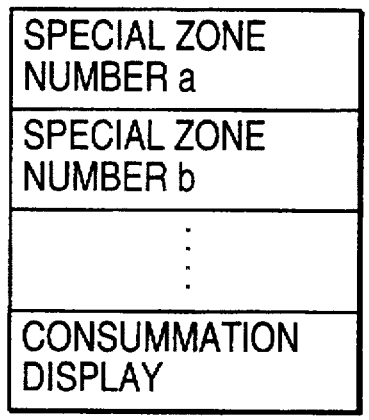
FIGS. 15A and 15B are diagrams showing data configurations of a special zone display 72 in the fourth embodiment of this invention.
Figure 15B:
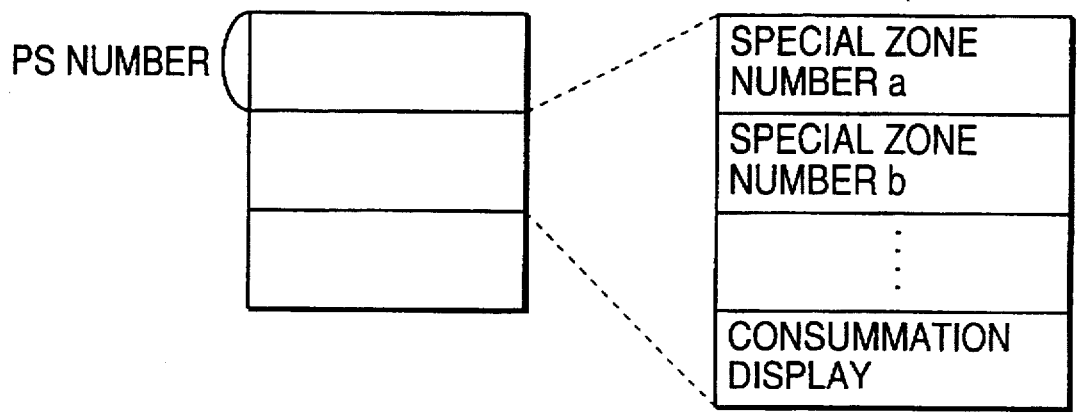

FIGS. 15A and 15B show data configurations of a special zone display (memory) 72 in the fourth embodiment of this invention.

Figure 16:
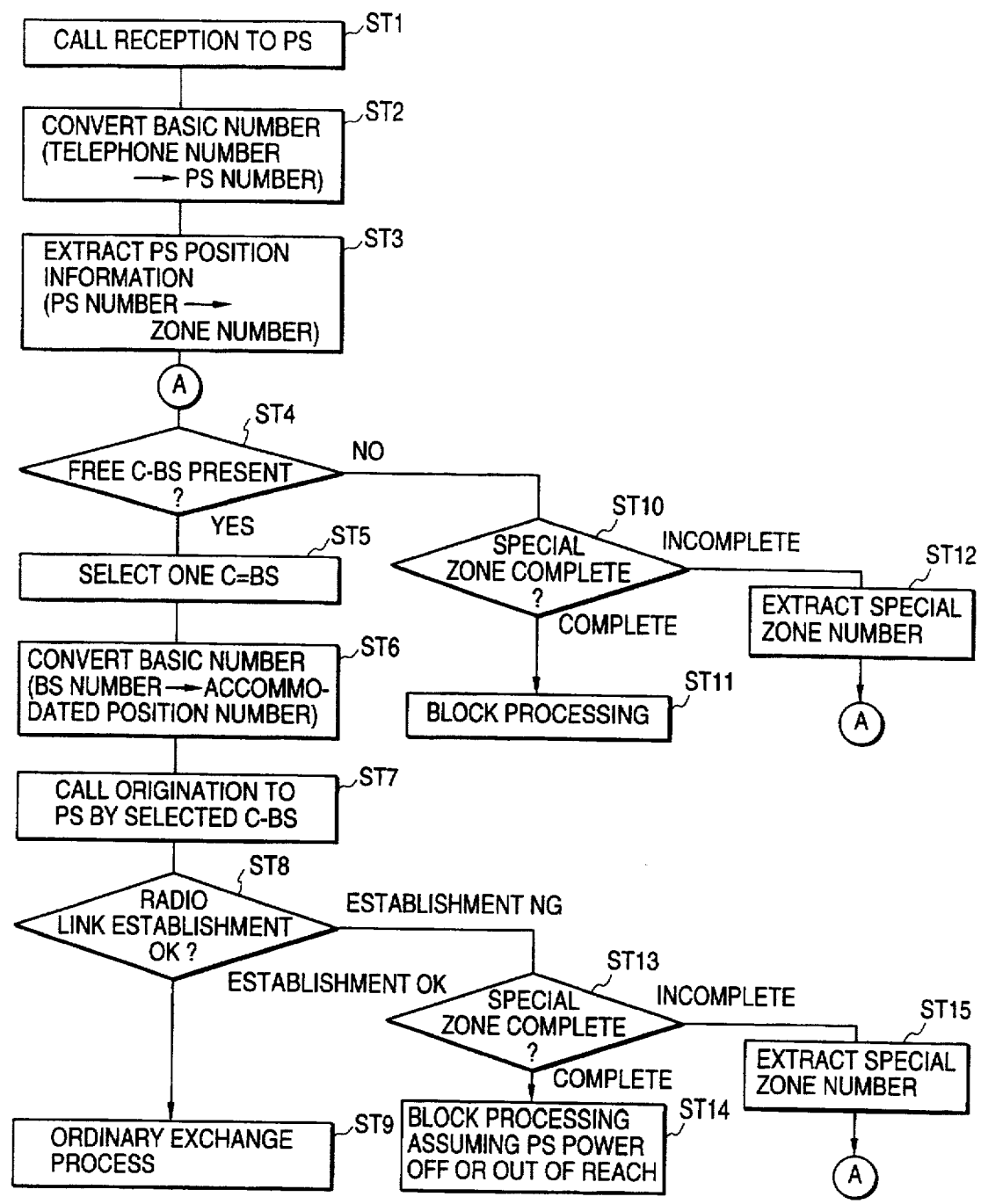
FIG. 16 is a flowchart showing processes at a call reception in the fourth embodiment of this invention.

FIG. 16 is a flowchart showing processes at a call reception.

Figure 1:
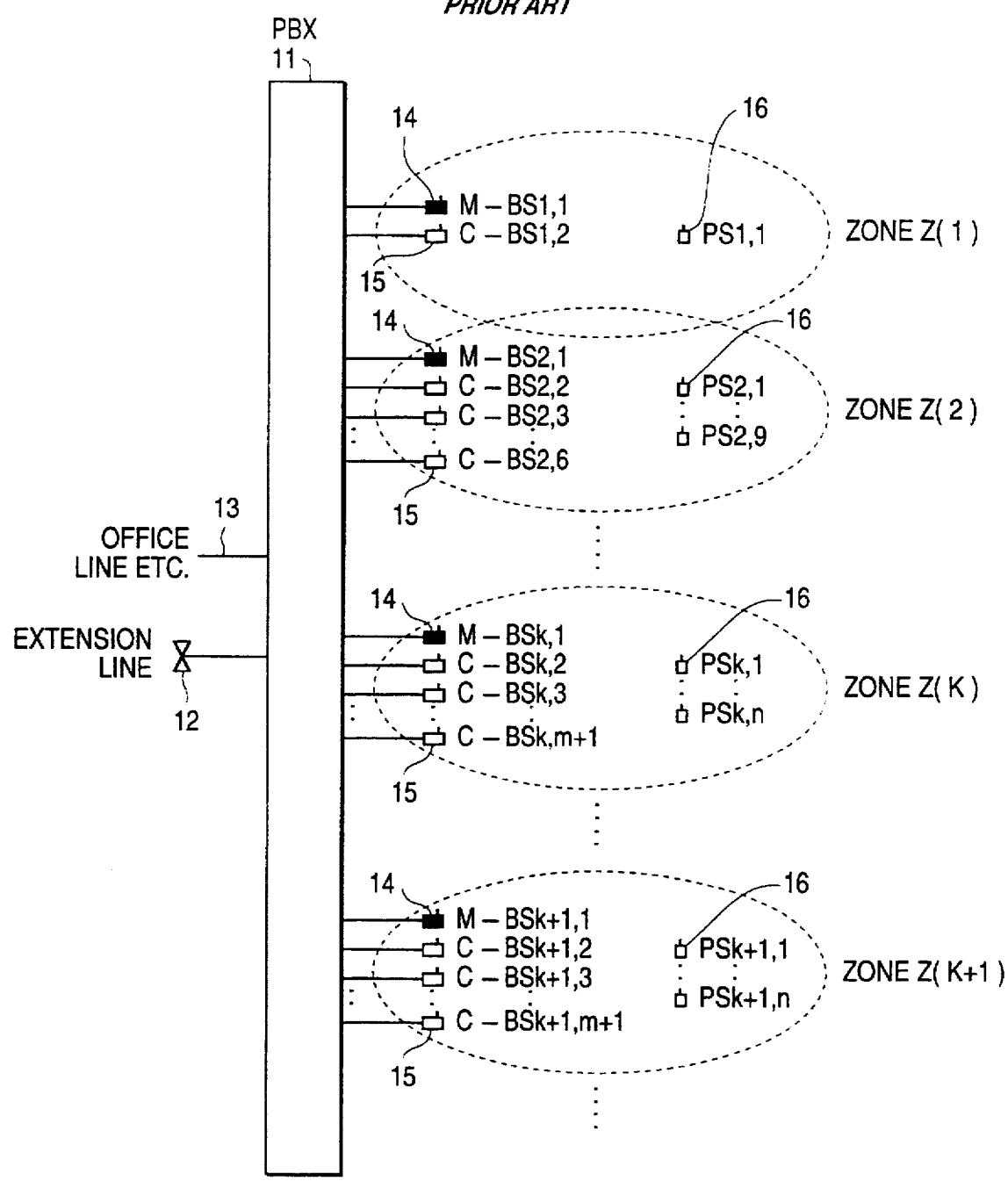
FIG. 1 is a system diagram of a prior art.
Figure 2:
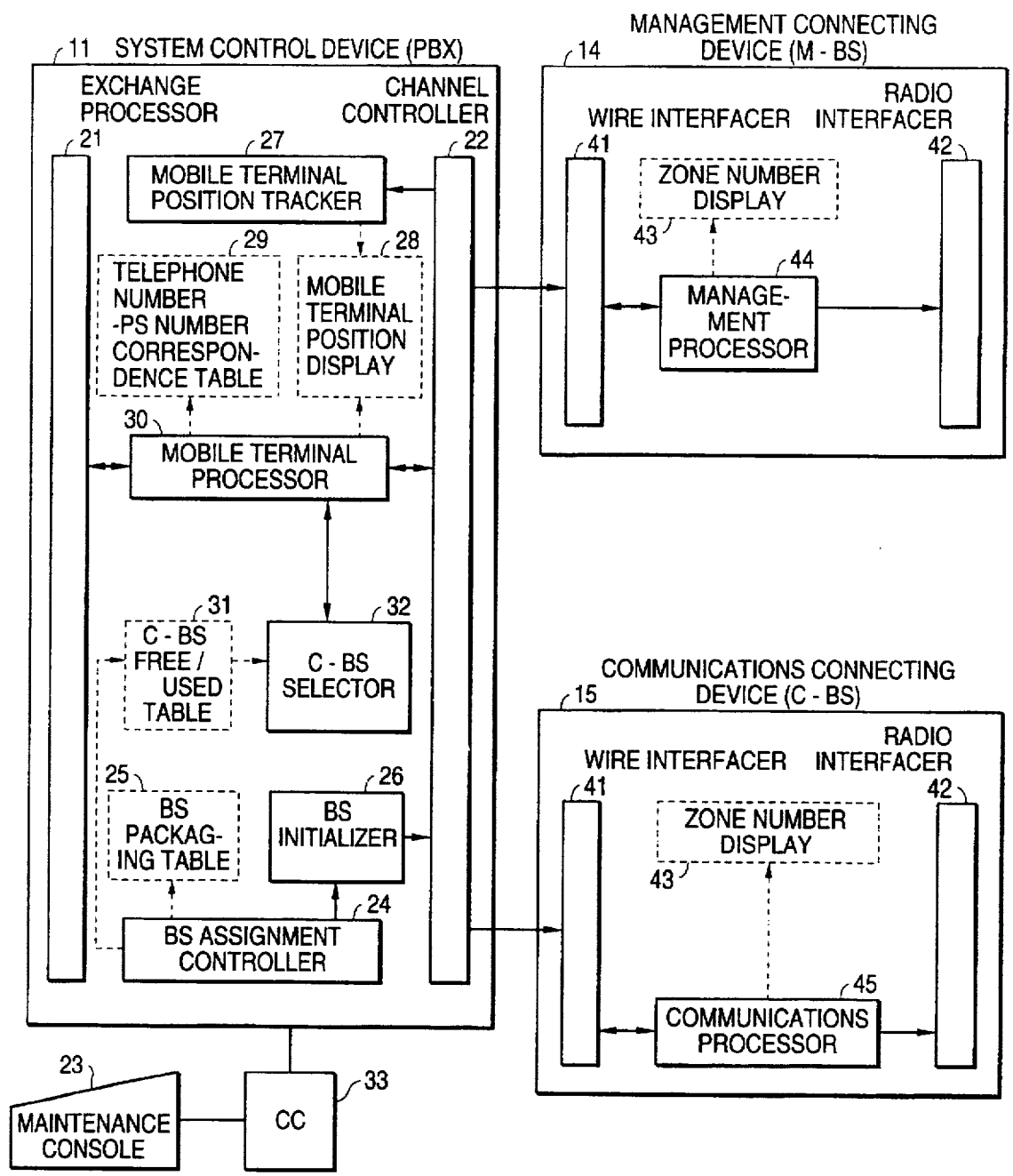
FIG. 2 is a block diagram showing a functional configuration of a prior art.

Parts shown in FIGS. 12 and 13 which are essentially identical to those shown in FIGS. 1 and 2 (illustrating a prior art) have the same numbers.

In FIG. 12, the PBX 11 connects with an extension line 12, an office line 13, and a plurality of management connecting devices (M-BS, SM-BS) 14-1 and 14-2 and a plurality of communications connecting devices (C-BS) 15. Each of plural zones (Z1 through Zn) split from the area to be managed by the radio exchanger has at least one each of the management connecting devices 14-1, 14-2 and communications connecting devices 15. Various user conditions of the mobile radio telephone apparatus determine the designing of places and number of units to be assigned.

The management connecting devices 14-1 and 14-2 regularly radio the mobile terminal (PS) 16 moving in from a foreign zone to its home zone and detect zones in which the mobile terminal 16 exists. Each of the communications connecting device 15 establishes a wireless communications channel with any of the mobile terminal 16 in its home zone.

A reference to FIG. 13 reveals that the PBX 11 comprises an exchange processor 21 for indigenous line switching, a channel controller 22 for wired communications with the management connecting devices 14-1 and 14-2 and the communications connecting device 15, and a maintenance console 23 as an external device for inputting various data.

The PBX 11 also comprises a BS assignment controller 24-2 for assigning (initializing) the management connecting devices 14-1 and 14-2 and communications connecting devices 15, a BS packaging table (memory) 25 as shown in FIG. 14A and a BS initializer 26. The PBX 11 further comprises a mobile terminal position tracker 27 for tracking the position of the mobile terminal 16, a mobile terminal position display (memory) 28 as shown in FIG. 14C and a telephone number—PS number correspondence table (memory) 29. The PBX 11 finally comprises a mobile terminal processor 30-2 for having the mobile terminal (PS) 16 receive a call, a C-BS free/used table (memory) 31 as shown in FIG. 14B and a C-BS selector 32, as well as the special zone display 72 as shown in FIG. 15A.

Each of the management connecting devices 14-1 and 14-2 comprises a wire interfacer 41 for wired communications with the PBX 11, a radio interfacer 42 for exchanging various information by wireless communications with the mobile terminal 16, a zone number display (memory) 43 with a home zone number set and a management processor 70, in addition to a process selector 71. Although this is not conspicuously shown, the communications connecting devices 15 have a configuration basically identical to that of the conventional one.

The management processor 70 of the management connecting devices 14-1 and 14-2 regularly communicate with the mobile terminal 16 in its home zone via the radio interfacer 42, and outputs position register information (its home zone number) indicating the position of the mobile terminal moving in from another zone to its home zone. The setting (ON, OFF) of the process selector 71 determines the emission of the position register information from the management processor 70 via the wire interfacer 41 to the PBX 11. When its setting is ON the process selector 71 stops the emission of the position register information, whereas when its setting is OFF the process selector 71 continues it.

Here, the correspondences between the structure of a second principle of this invention shown in FIG. 11 and the fourth embodiment shown in FIGS. 12 and 13 are made clear. The mobile terminal 16 shown in FIG. 11 corresponds to the mobile terminal 16 shown in FIG. 12. The communications unit 62 shown in FIG. 11 correspond to the communications connecting devices 15 shown in FIG. 12. The management unit 63 shown in FIG. 11 correspond to the management connecting devices 14-1 and 14-2 shown in FIGS. 12 and 13. The first memory unit 64 shown in FIG. 11 corresponds to the mobile terminal position display 28 shown in FIG. 13. The register unit 65 shown in FIG. 11 corresponds to the mobile terminal position tracker 27 shown in FIG. 13. The second memory unit 66 shown in FIG. 11 corresponds to the special zone display 72 shown in FIG. 13. The selection unit 67 shown in FIG. 11 corresponds to the process selector 71 shown in FIG. 13. The call reception control unit 68 shown in FIG. 11 corresponds to the mobile terminal processor 30-2 shown in FIG. 13.

The following is a serial description of (5) an assignment (initialization) of a management connecting device and a communications connecting device, (6) a position tracking of a mobile terminal, and (7) a call reception of a mobile terminal.

(5) an assignment (initialization) of a management connecting device and a communications connecting device:

Based on the system configuration shown in FIG. 12 individually designed by user traffic conditions, the user inputs necessary data via the CC (console controller) 33 from the maintenance console 23 for making an assignment. In this example, one [1] management connecting device either 14-1 or 14-2 and four [4] communications connecting devices 15 are assigned to each of the zones (Z1 through Zn), of which Z1 is designated as a special zone (a zone in which mobile terminals move in concentration spacewise and timewise, such as a dining room, a hall and a convention room) and Z2 through Zn are designated as generic zones (zones in which mobile terminals move little in concentration, such as a generic office room).

When a user inputs various data (including designation of a special zone) necessary for an assignment via the CC (console controller) 33 from the maintenance console 23, the assignment data are sent to the BS assignment controller 24-2, which creates and registers in a predetermined format, the BS packaging table 25, the C-BS free/used table 31 and the special zone display 72. Then, the BS initializer 26 creates data for initialization, including such data as respective zone numbers for the management connecting devices 14-1 and 14-2 and communications connecting devices 15 and the designation of a special zone, which are emitted via the channel controller 22 to the management connecting devices 14-1 and 14-2 and the communications connecting devices 15.

The data from the PBX 11 for initializing the management connecting devices 14-1 and 14-2 and the communications connecting devices 15 are sent via the wire interfacer 41 to the management processor 70, which performs an initialization such as setting the home zone number to the zone number display 43. Also, the management connecting devices 14-1 and 14-2 set ON or OFF to the process selector 71 based on a special zone designation in initialization data from the PBX 11. That is, those data set OFF the process selector 71 in each of the management connecting devices 14-1 respectively in charge of generic zones Z2 through Zn, and ON that in the management connecting device 14-2 (may be referred to as a special management connecting device) in charge of the special zone Z1.

(6) a position tracking of a mobile terminal:

Each of the management connecting devices 14-1 and 14-2 regularly emits the notifying information including the zone number set in the zone number display 43 via the radio interfacer 42 to the mobile terminal 16 in its home zone. On receiving the notifying information, the mobile terminal 16 existing in the corresponding zone compares it with the zone number it recognizes in itself. A comparison indicating a disparity (i.e. any mobile terminal 16 having moved from one zone to another) causes the mobile terminal 16 having a disparity update its recognition and emits to the corresponding one of the management connecting devices 14-1 and 14-2 the position register information including the PS number preassigned to itself. A comparison indicating a parity (i.e. the mobile terminal 16 having stayed within the same zone) causes no effect.

The radio interfacer 42 in each of the management connecting devices 14-1 and 14-2 receives the position register information from the mobile terminal 16 and sends it to the management processor 70.

In case of the management connecting devices 14-1 for managing generic zones Z2 through Zn, since the setting of the process selector 71 is OFF, the management processor 70 emits the position register information via the wire interfacer 41 to the PBX 11. In case of the special management connecting device 14-2 for managing special zones Z1, since the setting of the process selector 71 is ON, the management processor 70 emits no position register information to the PBX 11.

The position register information from the management connecting devices 14-1 received by the channel controller 22 in the PBX 11 is sent to the mobile terminal position tracker 27, which updates the zone number corresponding to the PS number set in the mobile terminal position display 28.

Thus, when a mobile terminal 16 moves to any of the generic zones Z2 through Zn, the corresponding one of the management connecting devices 14-1 sends the position register information about the mobile terminal 16 to the PBX 11, which recognizes the zone to which the mobile terminal 16 has moved. If a mobile terminal 16 moves to the special zone Z1, the position register information about the mobile terminal 16 is not sent to the PBX 11, thus, the PBX 11 remains cognizant of the premovement existence zone (old zone) of the mobile terminal 16.

(7) a call reception of a mobile terminal:

The explanation continues with reference to FIG. 16. When the exchange processor 21 detects a request for a call reception to a mobile terminal 16 in step ST1, the calling terminal sends a telephone number of the connectee to the mobile terminal processor 30-2. The mobile terminal processor 30-2 extracts the PS number corresponding to the telephone number from the telephone number—PS number correspondence table 29 in step ST2, and the zone number corresponding to the PS number from the mobile terminal position display 28 in step ST3.

Then, the mobile terminal processor 30-2 invokes the C-BS selector 32 for judging whether or not any of the communications connecting devices 15 in charge of the corresponding zone is free in step ST4. If some are free, it selects one of them in step ST5, and extracts the accommodated position number from the selected BS number (identification number preassigned to the particular one of the communications connecting devices 15) by referring to the C-BS free/used table 31 in step ST6 and notifies the mobile terminal processor 30-2.

The mobile terminal processor 30-2 emits call reception information including the PS number to the selected one of the communications connecting devices 15, and the receiving one of communications connecting devices 15 emits the call reception information to the corresponding mobile terminal 16 in step ST7.

The mobile terminal 16 receiving the call reception information whose preassigned PS number matches the PS number included in the call reception information returns the call reception consummation information to the corresponding ones of the communications connecting devices 15.

Because a return establishes a radio link (communications channel), it judges the presence or absence of a return (i.e. whether or not a radio link is established) in step ST8. When the radio link is established, (i.e. in case of an establishment being OK,) an ordinary exchange is performed in step ST9, and the call reception is consummated.

When it finds that nothing is free in step ST4, it judges whether or not the communications connecting devices 15 in charge of the special zone Z1 have consummated emissions of the call reception information in step ST10. When it finds a consummation, it performs a block processing (a predetermined processing for a call connection inability) in step ST11. The block processing is performed such as by emitting a busy sound or a voice message such as "Currently, all lines are busy." When it does not find a consummation, it extracts a special zone number from the special zone display 72 in step ST12 and reverts to step ST4. That is, it judges in step ST4 a presence or an absence of the communications connecting devices 15 in charge of the zone corresponding to the special zone number extracted in step ST12.

When no radio link is established in step ST8 (in case of an establishment being NG), it judges the consummation of the emission of the call reception information by the communications connecting device 15 in charge of the special zone Z1 in step ST13. When it finds a consummation, it performs a block processing by assuming that the corresponding mobile terminal 16 has its power off or does not exist in the particular zone in step ST14. The block processing is performed such as by emitting a busy sound or a voice message such as "You are moving out of the service zone." When it finds no consummation, it extracts a special zone number from the special zone display 72 in step ST15, and reverts to step ST4. That is, it judges in step ST4 the presence or absence of the communications connecting devices 15 in charge of the zone corresponding to the special zone number extracted in step ST15.

According to the fourth embodiment, even if the setting of the process selector 71 of the special zone management connecting device 14-2 in charge of the special zone Z1 is ON and any mobile terminal 16 has moved from another zone to the special zone Z1, the position register information about a mobile terminal 16 is not emitted to the PBX 11, but instead an instruction for emitting call reception information is given to the corresponding one of the management connecting devices 14-1 based on the position register information on the corresponding mobile terminal 16 recognized by the PBX 11, when a request is made for a call reception. When this does not establish a radio link, an instruction for emitting call reception information is given to the special management connecting device 14-2 in charge of the special zone Z1.

As such, even when more than one mobile terminal 16 moves in a batch to the special zone Z1, the PBX 11 does not track each position of the more than one mobile terminal 16, which prevents the PBX 11 to be overloaded, thereby ensuring a proper call reception.

Although the above embodiment assumes that there is only one [1] special zone, it goes without saying that a plurality of special zones can be set in system units, as shown in FIG. 15A. Also, even though in the above embodiment a special zone is set for each system, a special zone can be set for each mobile terminal 16 (for the PS number of a mobile terminal 16), as shown in FIG. 15B. This allows positions to be tracked according to the movement patterns of the mobile terminal users.

Further, when a special zone secures a call reception or a call emission, the mobile terminal position display 28 managed by the PBX 11 is updated, such that only the special zone processes a call reception when the next request is made for a call reception and that the zone in which the particular mobile terminal 16 existed immediately before moving to the special zone does not process the call reception, which further reduces the workload of the PBX 11.

Figure 17:
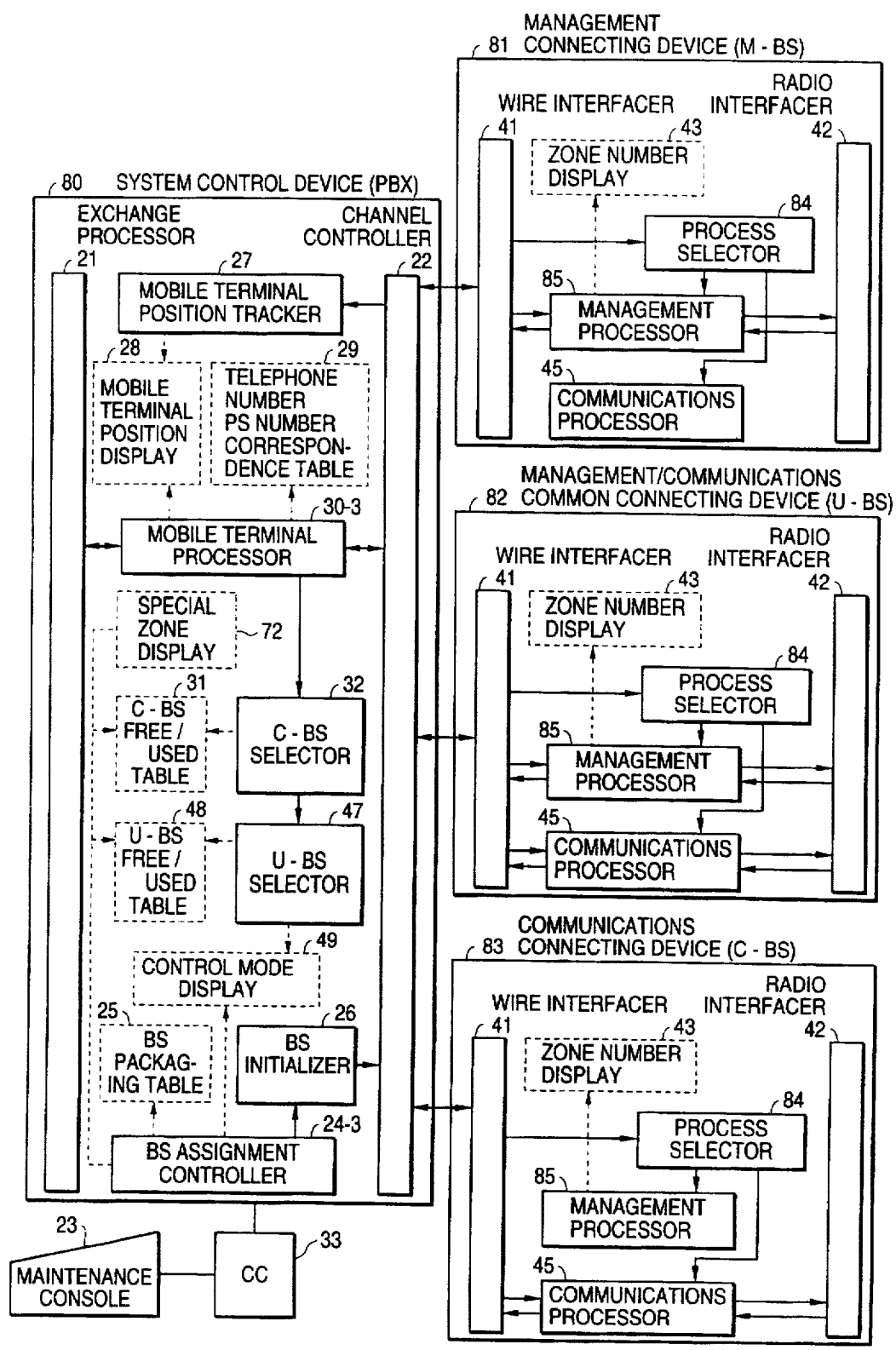
FIG. 17 is a block diagram of a fifth embodiment of this invention, which represents a form combining the first and second principles of this invention.

FIG. 17 is a block diagram of a fifth embodiment of this invention, which represents a form combining the first and second principles of this invention.

A system control device (PBX) 80 is obtained as the basic system in the first embodiment of this invention shown in FIG. 5 combined with the special zone display 72 shown in the fourth embodiment of this invention shown in FIG. 13, a BS assignment controller 24-3 and a mobile terminal processor 30-3. The BS assignment controller 24-3 and the mobile terminal processor 30-3 have functions for controlling the basic system in the first embodiment of this invention and the special zone display 72, respectively in addition to those of the BS assignment controller 24-1 and the mobile terminal processor 30-1.

Similarly, a management connecting device (M-BS) 81, a management/communications common connecting device (U-BS) 82 and a communications connecting device (C-BS) 83 have both the functions of the process selector 46 and the management processor 44 of the management connecting device (M-BS) 57, the management/communications common connecting device (U-BS) 58 and the communications connecting device (C-BS) 59 shown in FIG. 5 and the functions of the process selector 71 and the management processor 70 shown in FIG. 13. Here, the communications connecting device (C-BS) 83 operates the same as the communications connecting device (C-BS) 59 shown in FIG. 5, unless a management processor 85 is connected.

The management connecting device (M-BS) 81 and the management/communications common connecting device (U-BS) 82 have management functions variable by flags set in respective process selectors 84. Since the flags set in their process selectors 84 of the management connecting device (M-BS) 81 and the management/communications common connecting device (U-BS) 82 are off, their functions are the same as those of the management connecting device (M-BS) 57 and the management/communications common connecting device (U-BS) 58 shown in FIG. 5. If a zone managed by them is designated as a special zone, the flags set in their process selectors 84 of the management connecting device (M-BS) 81 and the management/communications common connecting device (U-BS) 82 are on.

Figure 18:
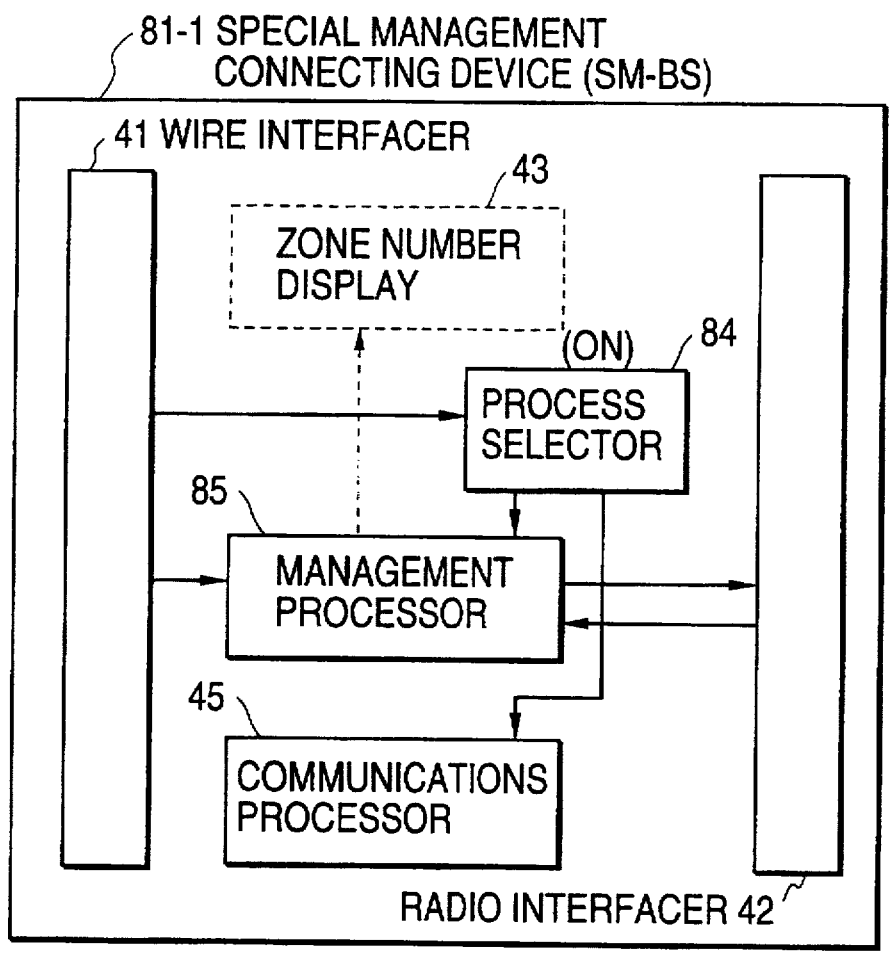

FIG. 18 shows internal connections of the management connecting device (M-BS) 81 which is shown by reference number 81-1, when the flag set in its process selector 84 is on.

Figure 19:
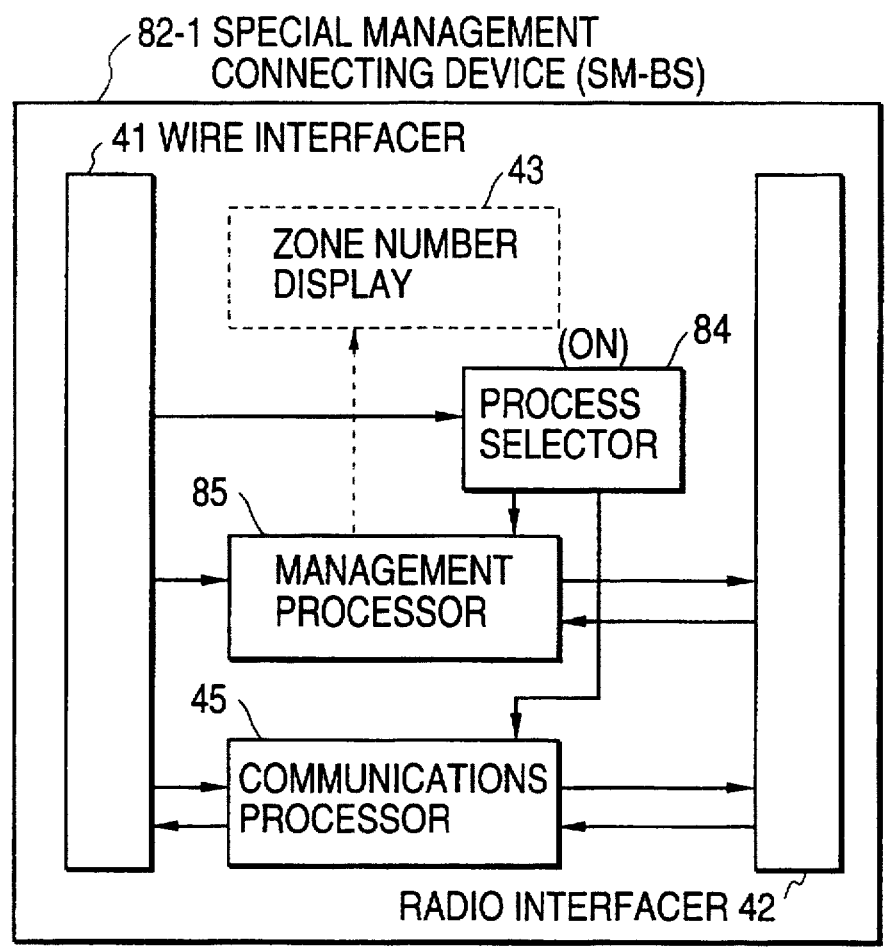

FIG. 19 shows internal connections of the management/communications common connecting device (U-BS) 82 which is shown by reference number 82-1, when the flag set in its process selector 84 is on.

When the flags of the process selectors 84 of the management connecting device (M-BS) 81 and the management/communications common connecting device (U-BS) 82 are set on for managing a special zone, (i.e. when 81 and 82 operate as special management connecting devices (SM-BS),) their management processors 85 do not notify the channel controller 22 of a zone entry of a mobile terminal (PS) 16. Because the PBX 80 no longer receives information of a zone entry, the management workload is reduced.

When every communications connecting device (C-BS) 83 managed by (either the management connecting device (M-BS) 81 or) the management/communications common connecting device (U-BS) 82 is used and an additional call is received or originated, the PBX 80 controls (either the management connecting device (M-BS) 81 or) the management/communications common connecting device (U-BS) 82 to become an extra communications connecting device (C-BS) 83. Because the flags of their process selectors 84 are on, their management processors 85 do not control the zone entry or zone exit of a mobile terminal (PS) 16, but perform other communications controls, e.g. for a call reception and a call origination, they can establish links for a call reception and a call origination.

Figure 20:
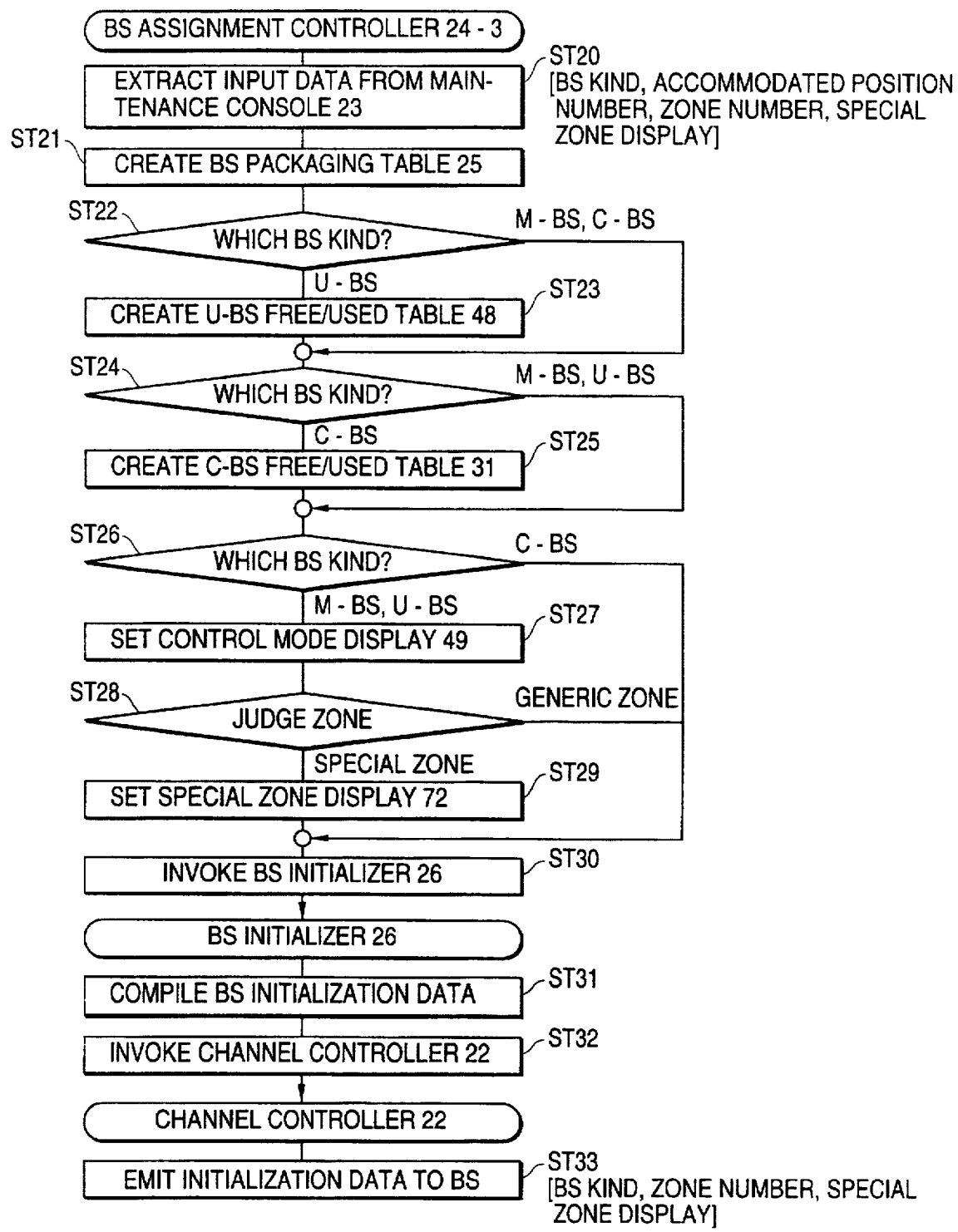
FIG. 20 is a flowchart showing the operations for an initialization by the PBX.

FIG. 20 is a flowchart showing the operations for an initialization by the PBX 80.

The decision for making a communications device (BS) into a management connecting device (M-BS), a communications connecting device (C-BS) or a management/communications common connecting device (U-BS) is made e.g. when it is installed. At this time, the maintenance console 23 allows input data comprising a BS kind, an accommodated position information and a special zone indication to be received. The BS assignment controller 24-3 extracts the input data from the maintenance console 23 in step ST20. Then, the BS packaging table 25 is created from the input data in step ST21. Then, the BS assignment controller 24-3 judges whether the BS kind is a U-BS in step ST22. When it is a U-BS, U-BS free/used table 48 is created in step ST23. When it is not a U-BS, step ST23 is skipped. Then, a judgment is made whether the BS kind is a C-BS in step ST24. When it is a C-BS, the C-BS free/used table 31 is created in step ST25. When it is not a C-BS, the process in step ST25 is skipped.

Further, a judgment is made whether the BS kind is an M-BS or a U-BS in step ST26. When it is either an M-BS or a U-BS, a control mode display 49 is set in step ST27. The above judgment and setting enables the kind of a connecting device (BS kind) to be determined and registered in the BS packaging table 25.

Then, a judgment is made, in step ST28, for each zone whether a zone is specified as a special zone. When it is specified as a special zone, a special zone display 72 is set in step ST29. When it is not specified as a special zone, the process in step ST29 is skipped. Then, the BS assignment controller 24-3 invokes the BS initializer 26 in step ST30. This invocation causes the BS initializer 26 to start its operations. The BS initializer 26 compiles BS initialization information in step ST31. The compiled result is outputted to the channel controller 22, which is invoked in step ST32.

The channel controller 22 emits BS initialization information to each connecting device in step ST33.

The above processes allow the PBX 80 to complete the initialization.

Figure 21:
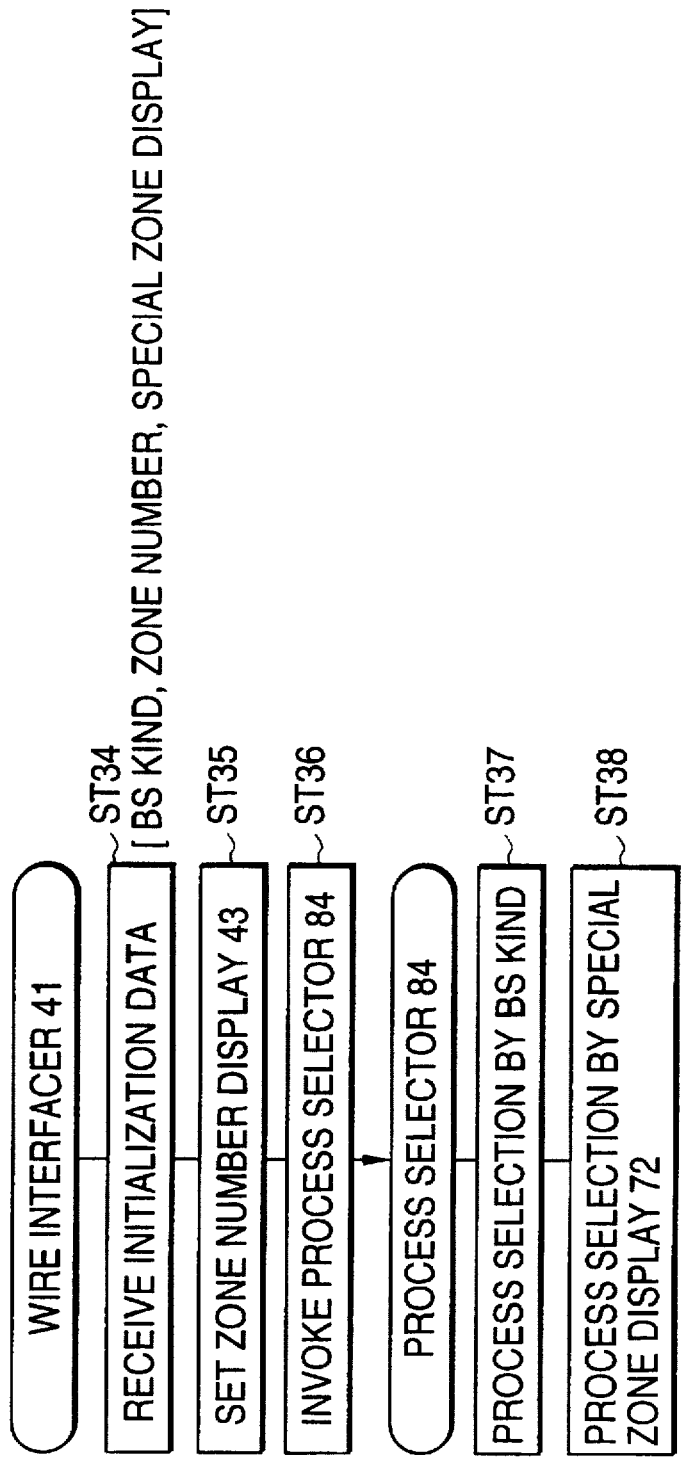
FIG. 21 is a flowchart showing the operations of the initialization by the PBX.

FIG. 21 is a flowchart showing the operations of the initialization by the PBX 80.

The wire interfacer 41 receives initialization data in step ST34. Meanwhile, the wire interfacer 41 of each connecting device sets the zone number display 43 in step ST35. Then, the process selector 84 is invoked in step ST36. This invocation causes the process selector 84 to start its operations. The process selection by the BS kind is executed in step ST37. Then, a process selection is performed in correspondence with the special zone display 72 in step ST38. This process limits the subsequent operations of the management processor 85, such that a registration of a mobile terminal (PS) 16 entering a special zone is suspended, which allows the management processor 85 to become a special management connecting device (SM-BS).

Figure 22:
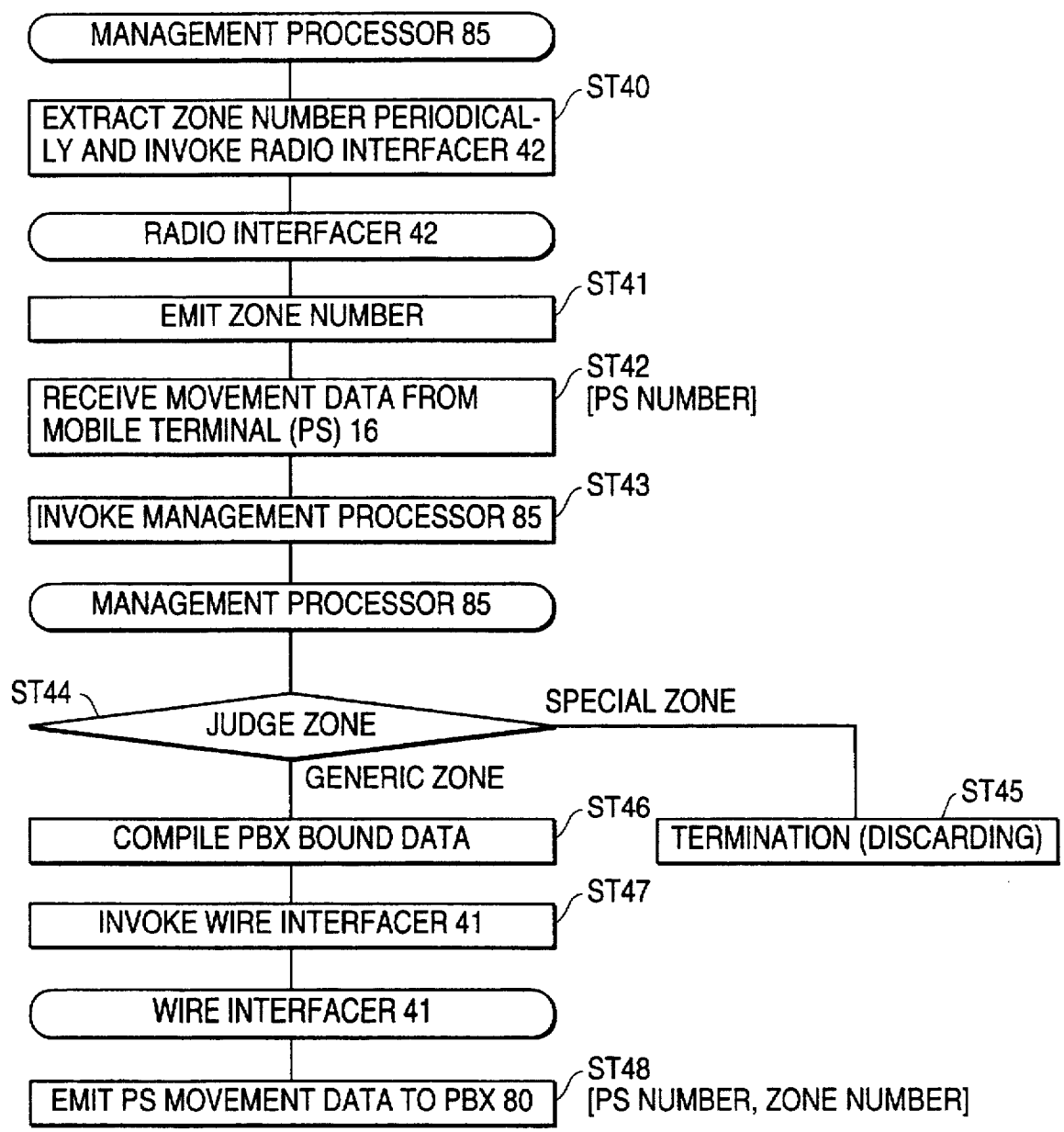
FIG. 22 is a flowchart showing the operations for tracking the position of the mobile terminal (PS) 16.

FIG. 22 is a flowchart showing the operations for tracking the position of the mobile terminal (PS) 16.

The management processor 85 periodically, i.e. in predetermined duration units, extracts a zone number and invokes a radio interfacer 42 in step ST40. This invocation causes the radio interfacer 42 to start its operations, and the zone number of a home zone is emitted in step ST41. In response to the emission of a zone number, movement information from the mobile terminal (PS) 16 is received in step ST42. The receipt invokes the management processor 85 in step ST43. The invocation causes the management processor 85 to start its operations. A judgment is made whether or not the home zone is a special zone in step ST44. When it is a special zone, the process terminates without any performance in step ST45. In an embodiment of this invention, when it is specified as a special zone, the management processor 85 of the zone manages the mobile terminal (PS) 16 moving into the special zone. Therefore, a special zone judgment in step ST44 causes no effect and the process just terminates.

On the other hand, a generic zone judgment in step ST44 data to be sent to PBX 80 (PBX-bound data) are compiled in step ST46. The PBX-bound data are outputted to the wire interfacer 41, which is invoked in step ST47.

This invocation causes the wire interfacer 41 to emit to the PBX 80 the PS movement information comprising the PS number of the mobile terminal (PS) 16 and the zone number of the zone to which the mobile terminal (PS) 16 has moved, thereby terminating the process in the movement.

Figure 23:
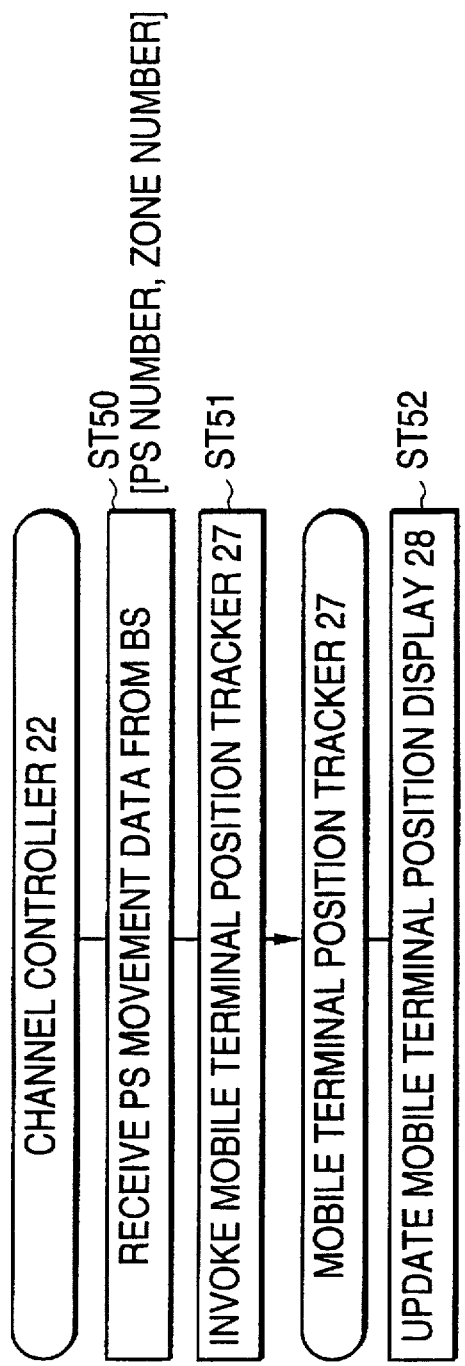
FIG. 23 is a flowchart showing the operations of the channel controller 22 in the PBX on receiving the PS movement information from the wire interfacer 41.

FIG. 23 is a flowchart showing the operations of the channel controller 22 in the PBX 80 on receiving PS movement information from the wire interfacer 41.

On receiving PS movement information from the wire interfacer 41 in step ST50, the channel controller 22 invokes the mobile terminal position tracker 27 in step ST51, and the mobile terminal position tracker 27 updates the mobile terminal position display 28 in step ST52.

When a zone is a special zone, because steps ST46, ST47 and ST48 are not executed, no PS movement information is emitted to the PBX 80. Because this prevents the updation in step ST52, even if more than one [1] mobile terminal (PS) 16 moves in concentration to a particular zone, it causes no effect of delaying other processes.

Figure 24:
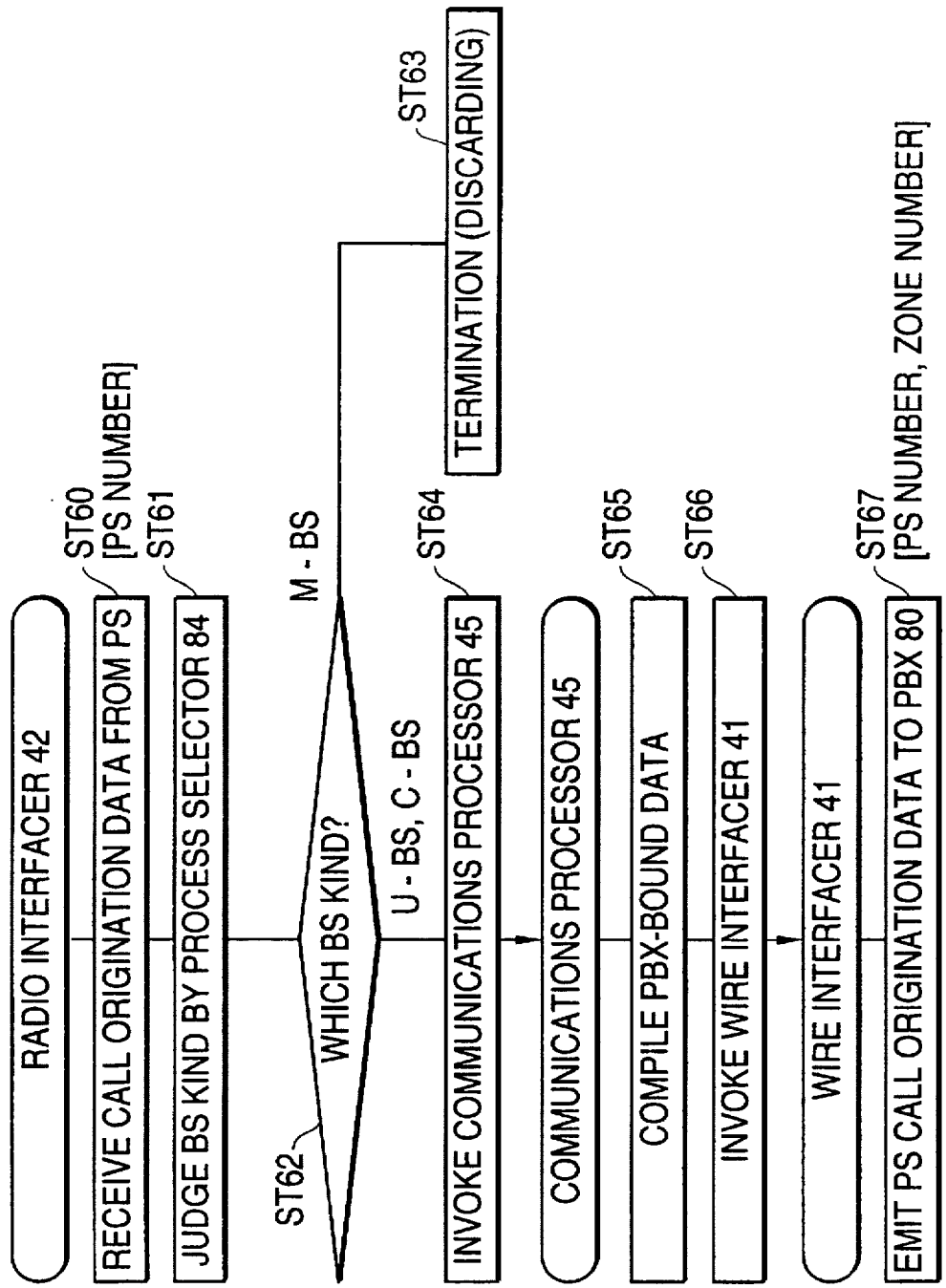
FIG. 24 is a flowchart showing the operations of a connecting device (BS) for a call origination from a mobile terminal (PS) 16.

FIG. 24 is a flowchart showing the operations of a connecting device for a call origination from a mobile terminal (PS) 16.

When the radio interfacer 42 receives call origination data from a mobile terminal (PS) 16 in step ST60, the process selector 84 judges its own BS kind in step ST61. When it is a management connecting device (M-BS), a branching is made in step ST62 and the process terminates in step ST63. When it is a communications connecting device (C-BS) or a management/communications common connecting device (U-BS), the communications processor 45 is invoked in step ST64.

This invocation causes the communications processor 45 to start its operations. After the PBX-bound data, i.e. the PS call origination data, are compiled in step ST65, the wire interfacer 41 is invoked in step ST66. The wire interfacer 41 emits the PS call origination data to the PBX 80 in step ST67. The PS call origination data comprise a PS number, a zone number and a BS accommodated position number. In an embodiment of this invention, the current position of a mobile terminal (PS) 16 is not confirmed, when the mobile terminal (PS) 16 originates a call. A mere request for a call origination causes a start of the earlier described processes for a call origination. This ensures a secure call origination regardless of the presence of a mobile terminal (PS) 16 in a special zone.

Figure 25:
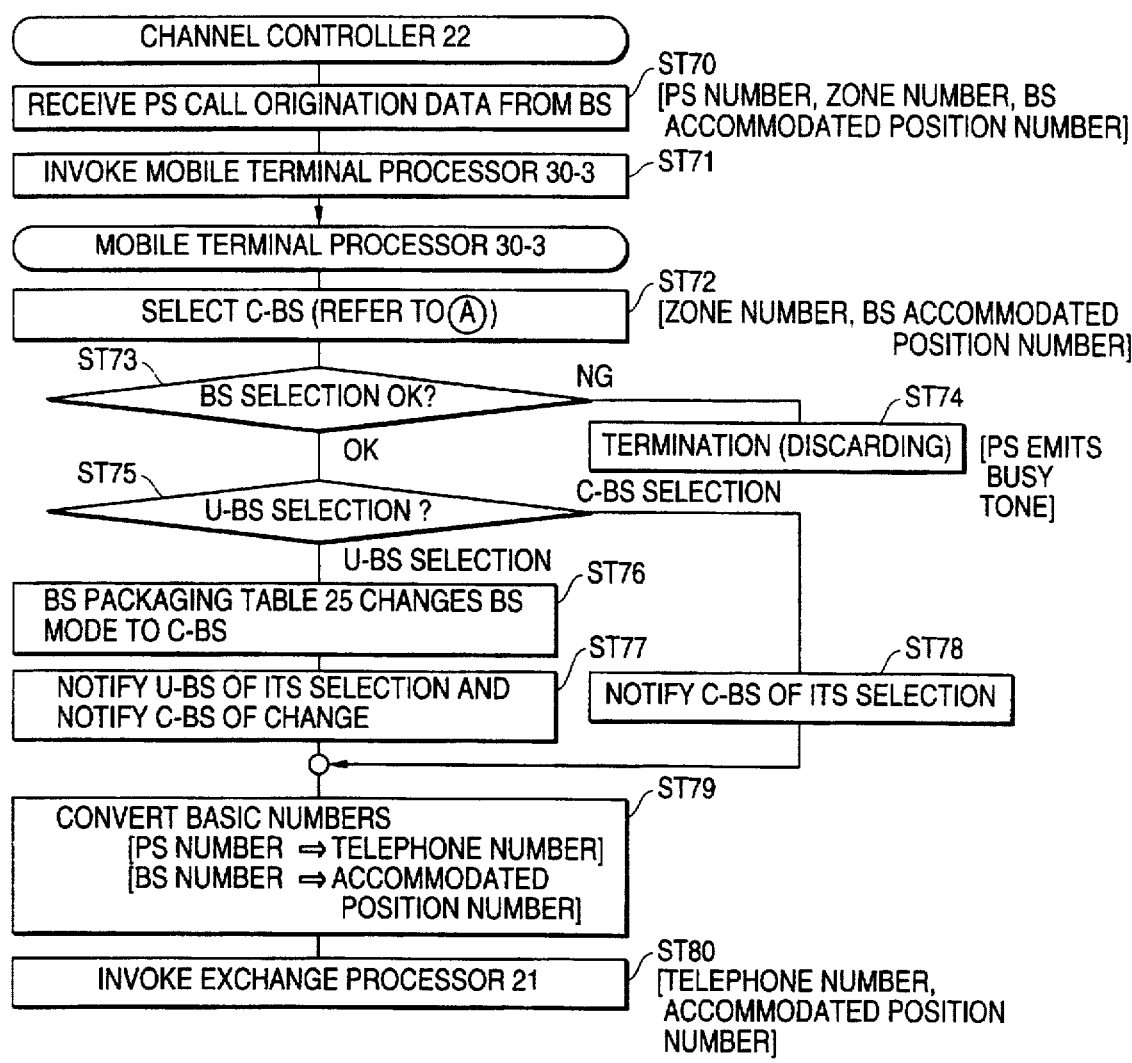
FIG. 25 is a flowchart showing the operations of the PBX 11 on receiving PS call origination data.

FIG. 25 is a flowchart showing the operations of the PBX 80 on receiving PS call origination data.

After the channel controller 22 of the PBX 80 receives the PS call origination data (comprising a PS number, a zone number and a BS accommodated position number) in step ST70, the mobile terminal processor 30-3 is invoked in step ST71. The mobile terminal processor 30-3 thus invoked select a communications connecting device (C-BS) in step ST72. That is, the C-BS selector 32 is invoked.

Figure 26:
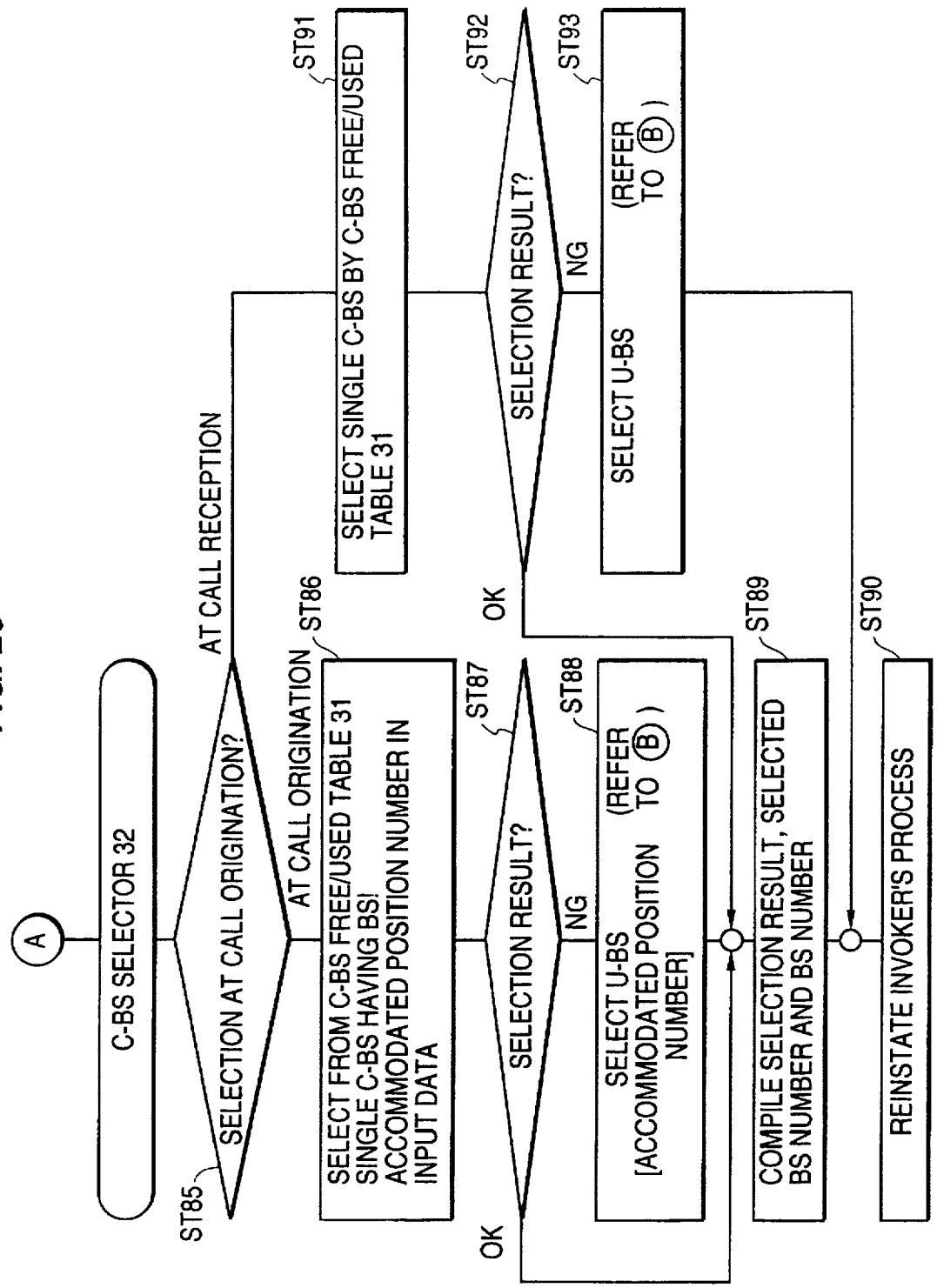
FIG. 26 is a flowchart showing the operations of the C-BS selector 32.
Figure 28:
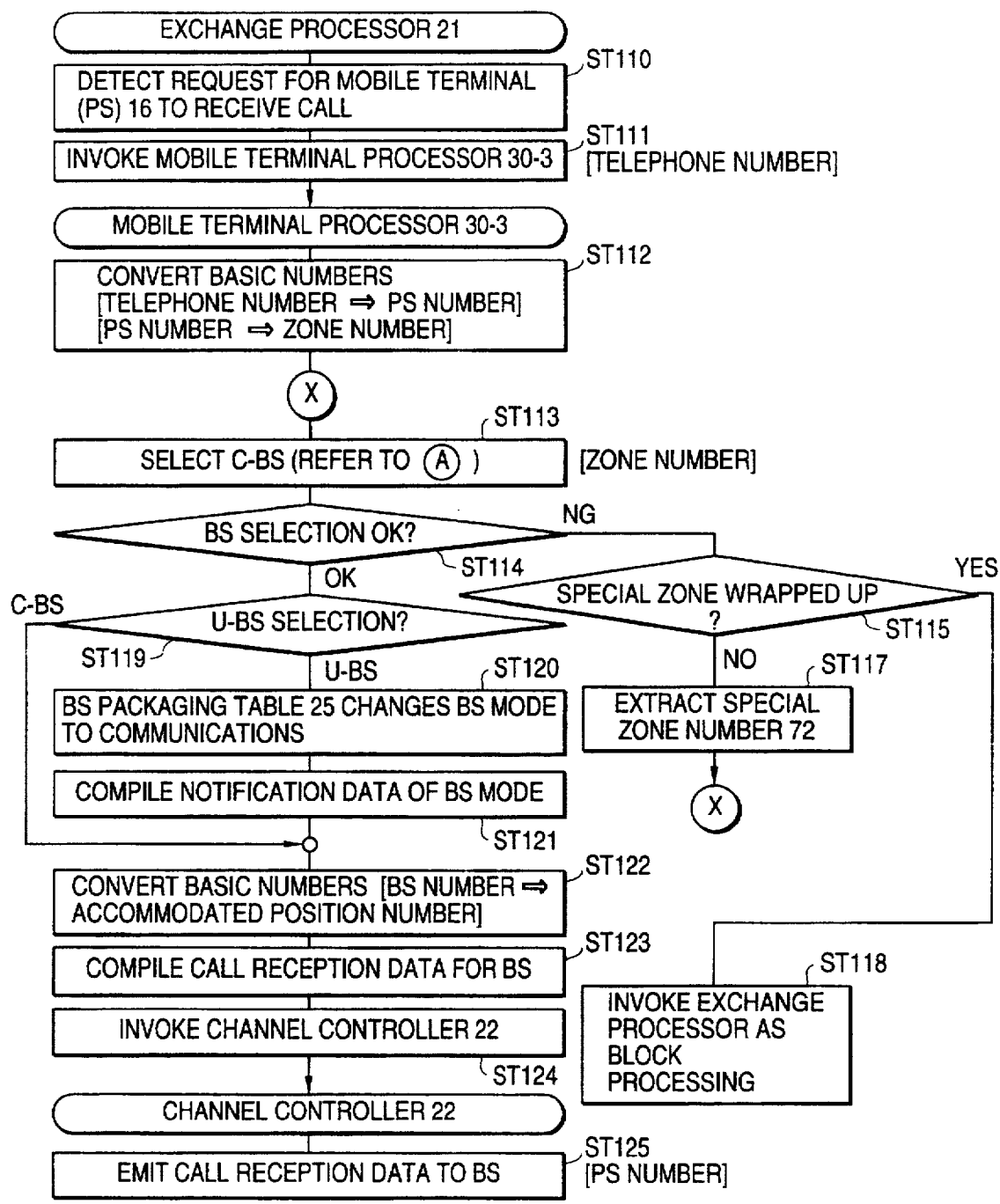
FIG. 28 is a flowchart showing the operations for a call reception by a mobile terminal (PS) 16.

FIG. 26 is a flowchart showing in detail the operations of the C-BS selector 32 in step ST72 shown in FIG. 22 and step ST113 shown in FIG. 28.

When the C-BS selector 32 starts its operations, a judgment is made whether a selection is at a call origination in step ST85. When it is for a call origination, the single communications connecting device (C-BS) having the BS accommodated position number in the input data is selected from the C-BS free/used table 31 in step ST86. Then, the selection result is judged in step ST87. When the selection is NG, there is no free communications connecting device (C-BS), and a management/communications common connecting device (U-BS) is selected in step ST88. The U-BS selector 47 performs this process.

Figure 27:
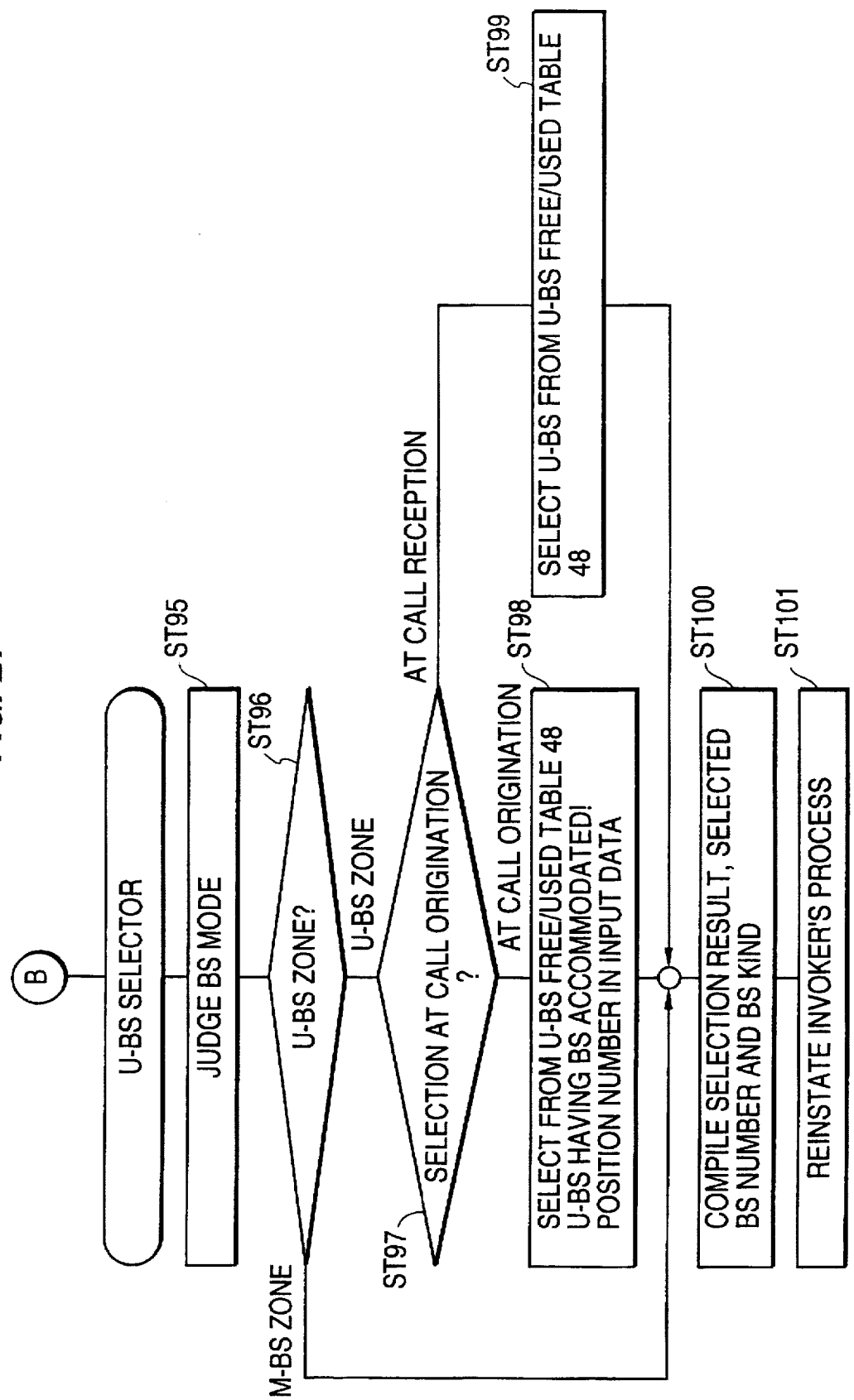
FIG. 27 is a flowchart showing in detail the operations of the U-BS selector 47.

FIG. 27 is a flowchart showing in detail the operations of the U-BS selector 47 in step ST88 and step ST93 in FIG. 26.

A BS mode is judged in step ST95 and the result is judged in step ST96. When the BS mode is judged to be for a management/communications common connecting device (U-BS), a judgment is made whether the selection is at a call origination in step ST97. When the selection is judged to be at a call origination, the management/communications common connecting device (U-BS) having the BS accommodated position number in the input data is selected from the U-BS free/used table 48 in step ST98. When the selection is judged to be at a call reception in step ST97, the U-BS free/used table 48 selects a U-BS in step ST99.

When the BS mode is judged to be for management connecting device (M-BS) in step ST96, or when steps ST98 and ST99 are terminated, the selection result, the selected BS number and the BS kind are compiled in step ST100. Then, the original processing of an invoker is reinstated in step ST101.

Returning to FIG. 26, when the earlier described result in step ST88 or the selection result is judged to be OK in step ST87, the selection result, the selected BS number and the BS kind are compiled in step ST89. Then, the original processing of an invoker is reinstated in step ST90.

Meanwhile, when the selection is judged to be at a call reception in step ST85, one [1] C-BS is selected in step ST91, and the selection result is judged in step ST92. When a selection is OK, processes from step ST89 are executed. When a selection is NG, a management/communications common connecting device (U-BS) is selected in step ST93. The selection in step ST93, as with step ST88, is a process explained in the description of FIG. 27. Then, the original processing of an invoker is reinstated in step ST90.

The above operations allow the selection in step ST72 shown in FIG. 25 to be perfected.

Returning to FIG. 25, the explanation continues. A judgment is made in step ST73 whether a connecting device (BS) is selected. Because a failure (NG) in a BS selection disables communications, the process terminates and the call origination is discarded in step ST74. For example, the mobile terminal (PS) 16 emits a busy tone.

A success (OK) in a BS selection causes a judgment to be made whether in step ST75 a management/communications common connecting device (U-BS) is selected.

When a management/communications common connecting device (U-BS) is judged to be selected, the BS mode registered in the BS packaging table 25 is changed in step ST76. Then, in step ST77, the management/communications common connecting device (U-BS) is notified of its selection and its conversion to a communications connecting device (C-BS). When in step ST75 a communications connecting device (C-BS) is judged to be selected, the communications connecting device (C-BS) is notified of its selection in step ST78.

After steps ST77 and ST78, basic numbers are converted by referring to the telephone number—PS number correspondence table 29 and the BS packaging table 25 in step ST79. For example, a PS number is converted to a telephone number, and a BS number is converted to an accommodated position number. Then, the exchange processor 21 is invoked in step ST80, thereby enabling an exchange to be performed and an intended call origination is executed.

FIG. 28 is a flowchart showing the operations of the exchange processor 21 in the PBX 80 for a call reception by a mobile terminal (PS) 16.

When the exchange processor 21 detects a request for a call reception by a mobile terminal (PS) 16 in step ST110, the mobile terminal processor 30-3 corresponding to the telephone number is invoked in step ST111.

The mobile terminal processor 30-3 thus invoked convert the basic numbers, i.e. from a telephone number to a PS number and from a PS number to a zone number in step ST112, by using the mobile terminal position display 28 and the telephone number—PS number correspondence table 29.

After step ST112, a communications connecting device (C-BS) is selected in step ST113. The selection is a process explained in the description of FIG. 26. Needless to say that "X" signs in FIG. 28 show the merger of a reverted flow.

Then, a judgment is made in step ST114 whether a BS selection is OK or NG. When the selection is judged to be NG, because a mobile terminal (PS) 16 is may be moving to a special zone, a judgment is made in step ST115 whether or not a special zone is wrapped up. When a special zone is not yet wrapped up, the special zone number is extracted in step ST117, and the process reverts to step ST113. When a special zone is already wrapped up, the exchange processor 21 is invoked in step ST118 to perform a block processing.

When a BS selection is judged to be OK in step ST114, it is further judged in step ST119 whether or not a management/communications common connecting device (U-BS) is selected. When a management/communications common connecting device (U-BS) is judged to be selected, the BS packaging table 25 changes the BS mode for the communications. The PBX-bound data of the BS mode are compiled in step ST121. Meanwhile, when a communications connecting device (C-BS) is judged to be selected in step ST119, because the BS mode is for a communications connecting device (C-BS), the BS mode need not be changed, thereby skipping steps ST120 and ST121.

Then, by referring to the BS packaging table 25, the basic numbers are converted, i.e. from a BS number to an accommodated position number, in step ST122. Call reception data for a connecting device (BS) is compiled in step ST123 for an output to the channel controller 22, which is invoked in step ST124. This invocation causes the channel controller 22 to emit call reception data to the connecting device (BS) in step ST125.

Figure 29:
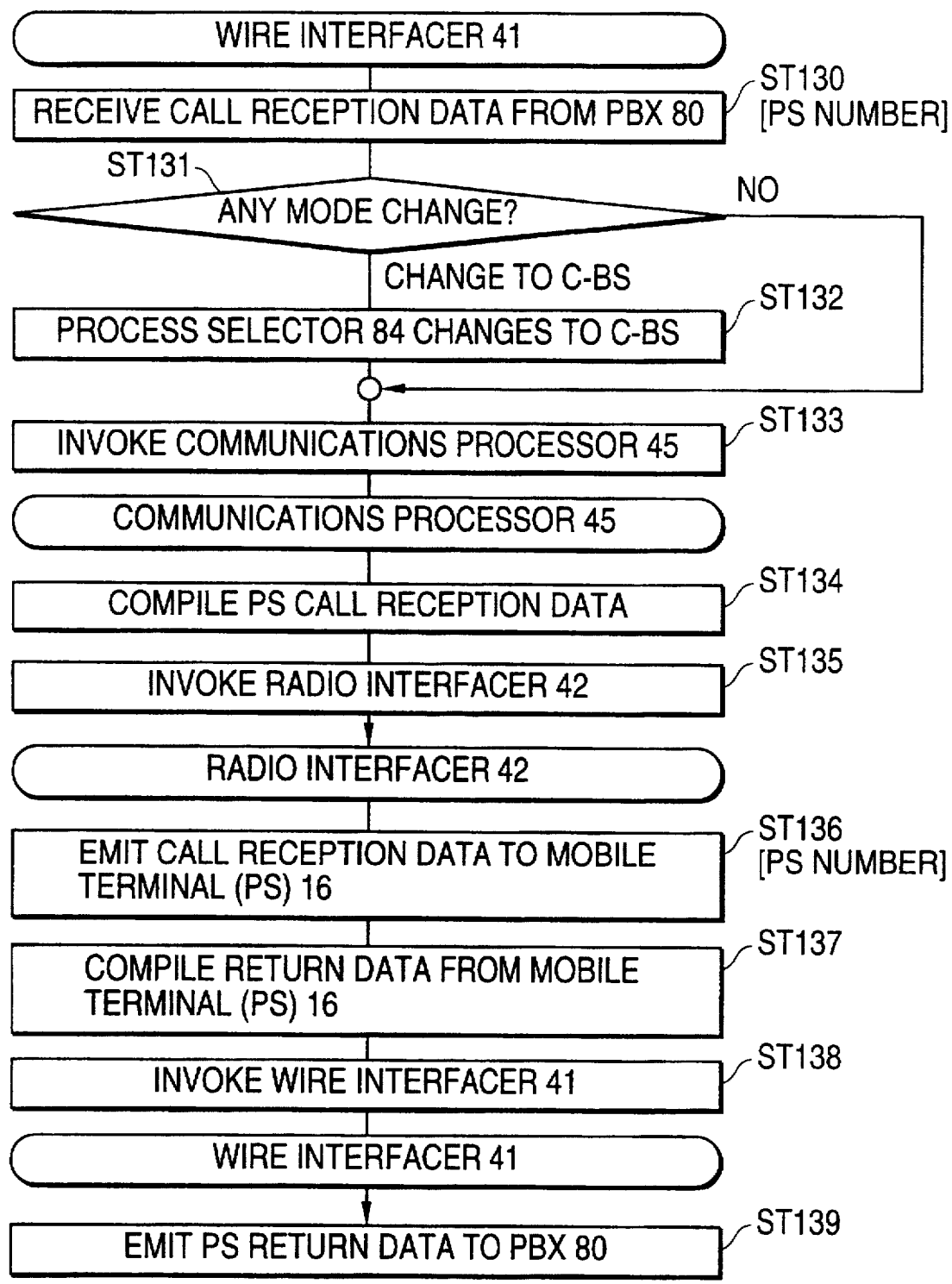
FIG. 29 is a flowchart showing the operations of a connecting device (BS), when a mobile terminal (PS) 16 receives a call.

FIG. 29 is a flowchart showing the operations of a connecting device (BS), when a mobile terminal (PS) 16 receives a call.

When the call reception data emitted in step ST125 are received, i.e. when the PS number is received, in step ST130, it is judged in step ST131 whether or not the BS mode has changed. When the BS mode has not changed, step ST132 has skipped. When the BS mode has changed, the process selector 84 causes a change in step ST132 for a selection of a communications connecting device (C-BS). Then, the communications processor 45 is invoked in step ST133.

The invoked communications processor 45 compiles the PS call reception data in step ST134, and the radio interfacer 42 is invoked in step ST135. The radio interfacer 42 emits the call reception data to the mobile terminal (PS) 16 in step ST136. Then, the return data from the mobile terminal (PS) 16 corresponding to the emitted PS number is compiled in step ST137, and the wire interfacer 41 is invoked in step ST138. The return data from the wire interfacer 41 emits the PS return data to the PBX 80 in step ST139.

Figure 30:
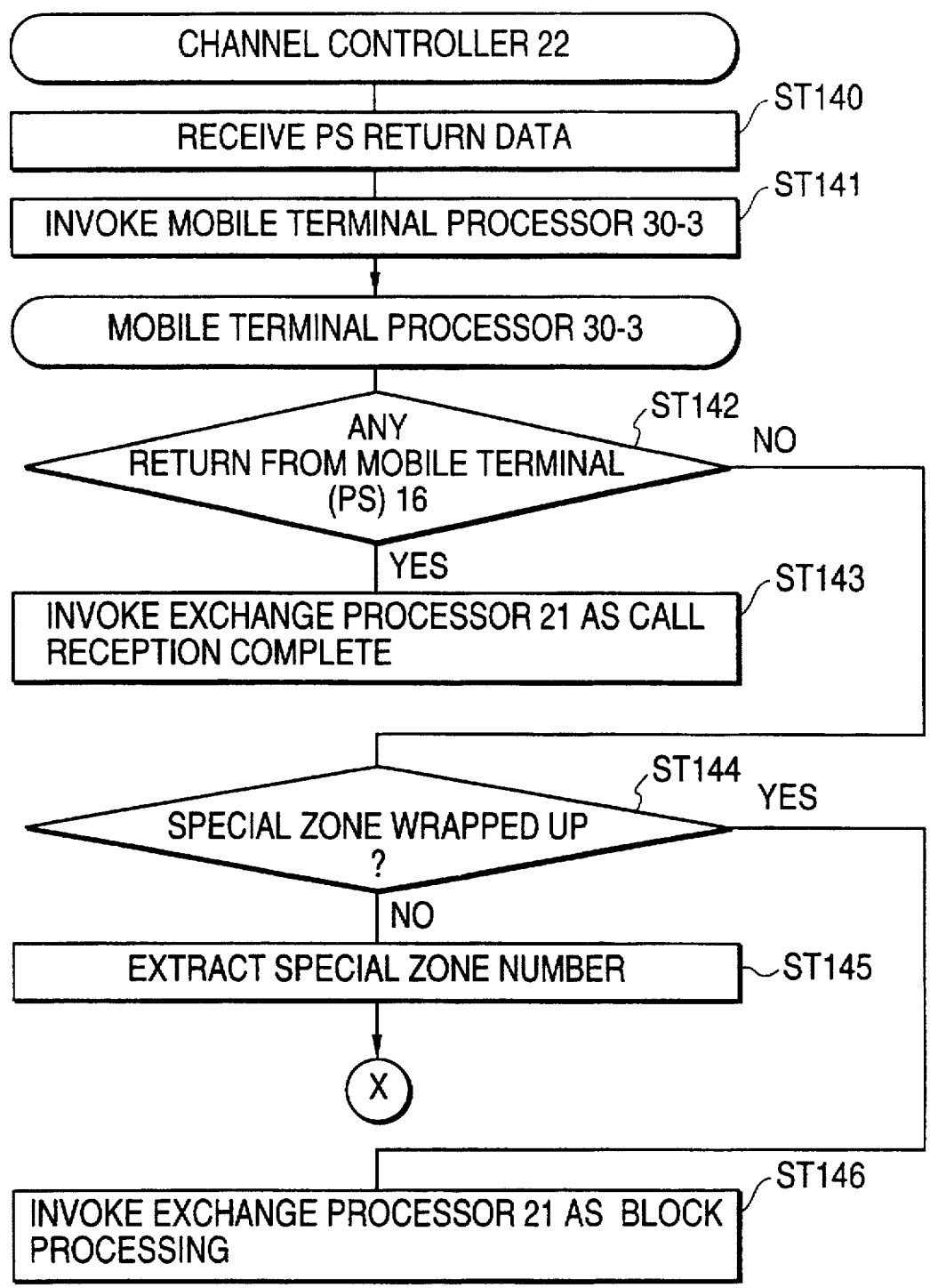
FIG. 30 is a flowchart showing the operations of the channel controller 22 when the mobile terminal (PS) 16 receives a call.

FIG. 30 is a flowchart showing the operations of the channel controller 22 when the mobile terminal (PS) 16 receives a call.

The channel controller 22 stands by for a response, after it emits reception data to the mobile terminal (PS) 16 in step ST125 shown in FIG. 28. The channel controller 22 then receives PS return data in step ST140.

The channel controller 22 invokes the mobile terminal processor 30-3 in step ST141.

This invocation causes the mobile terminal processor 30-3 to check the presence of a return from the mobile terminal (PS) 16 in step ST142. When a return is judged to be present, the mobile terminal processor 30-3 assume that a call reception is complete, and invoke the exchange processor 21 in step S143, thereby establishing a link with an intended mobile terminal (PS) 16.

When a return from the mobile terminal (PS) 16 is not judged to be present in step ST142, it is judged in step ST144 whether a special zone is wrapped up. When it is not judged to be wrapped up, the special zone number is extracted in step ST145, and the process reverts to step ST113. When a special zone is judged to be wrapped up, the mobile terminal processor 30-3 invokes the exchange processor 21 for a block processing in step ST146.

Figure 31:
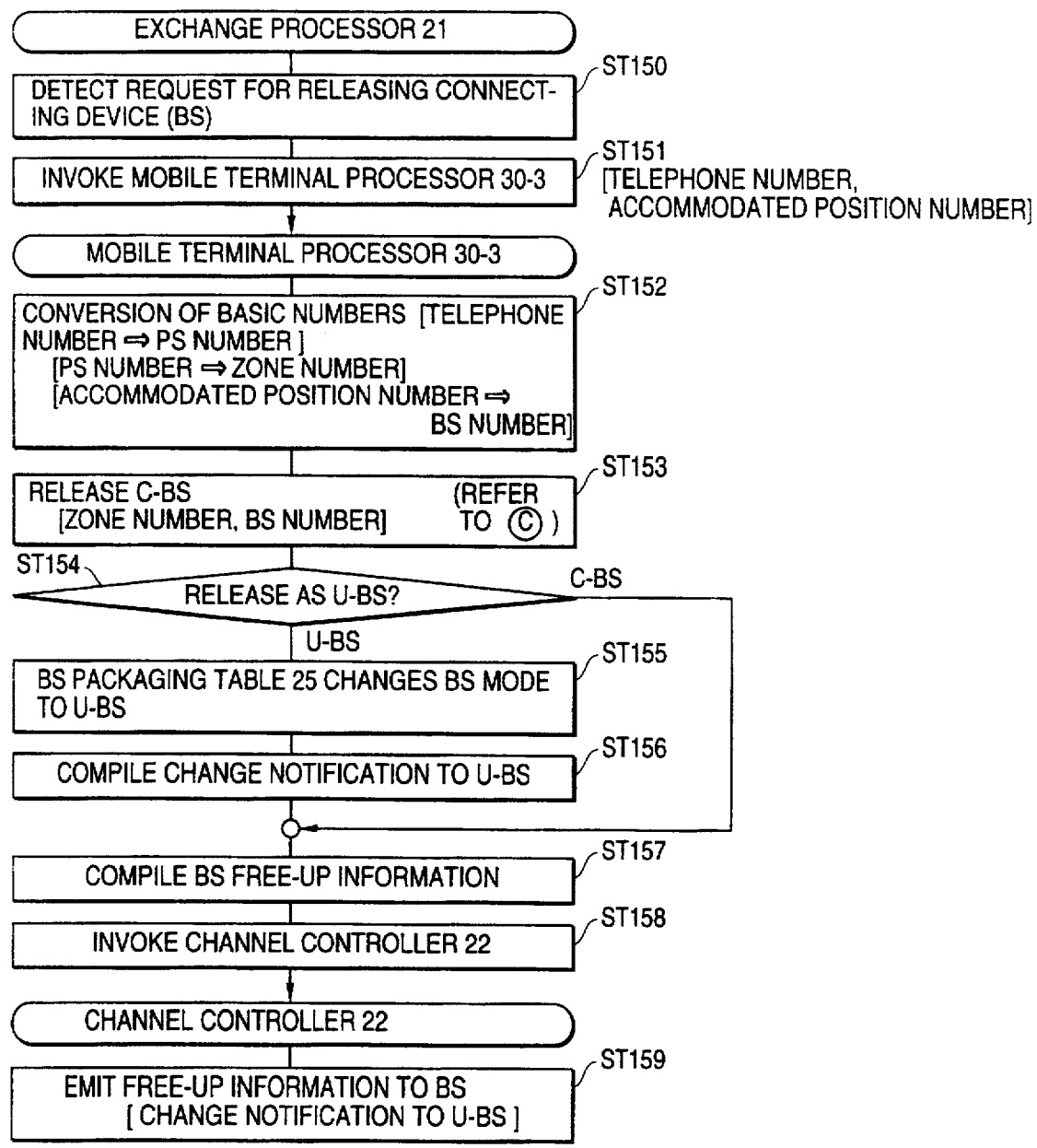
FIG. 31 is a flowchart showing the operations for releasing a connecting device (BS)

FIG. 31 is a flowchart showing the operations for releasing a connecting device (BS).

When the exchange processor 21 detects a request for releasing a connecting device (BS) in step ST150, it outputs a telephone number and an accommodated position number to the mobile terminal processor 30-3 and invokes them in step ST151.

The mobile terminal processor 30-3 thus invoked convert basic numbers in step ST152. That is, they convert a telephone number to a PS number by the telephone number—PS number correspondence table 29, a PS number to a zone number by the mobile terminal position display 28, and an accommodated position number to a BS number by the BS packaging table 25.

Then, a C-BS is released from the zone number and the BS number in step ST153.

Figure 32:
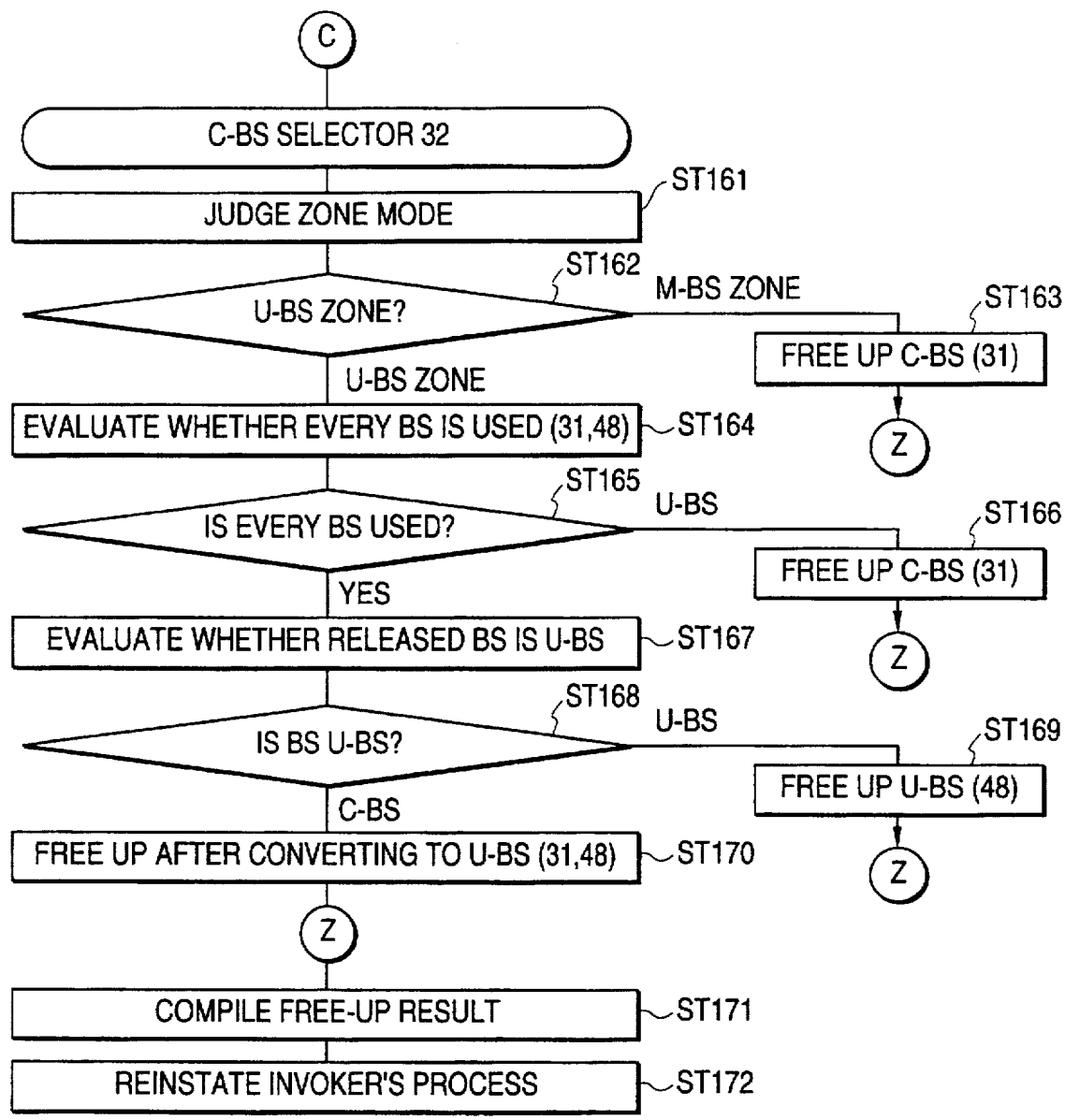
FIG. 32 shows in detail the operations for releasing a communications connecting device (C-BS)

FIG. 32 shows in detail the operations for releasing a communications connecting device (C-BS).

First, the C-BS selector 32 judges a zone mode by using the control mode display 49 in step S161. Then, a zone mode is judged in step ST162 whether the zone mode is the U-BS mode or the M-BS mode. When it is judged to be the M-BS mode, a C-BS is freed up in step ST163, which is registered in the C-BS the U-BS mode in step ST162, by referring to the U-BS free/used table 48, it is evaluated in step ST164 whether every BS is being used. The C-BS selector 32 refers to the C-BS free/used table 31 and the U-BS free/used table 48 in step ST164, and judges the evaluated result in step ST165. When not every connecting device (BS) is judged to be used, a C-BS is freed up in step ST166, as with step ST163, and the change is registered in the C-BS free/used table 31.

When it is judged in step ST165 that every connecting device (BS) is used, it is evaluated in step ST167 whether a released connecting device (BS) is a management/communications common connecting device (U-BS) or a communications connecting device (C-BS), and judges the evaluated result in step ST168. When the released BS is judged to be a management/communications common connecting device (U-BS) in step ST168, it is simply released as a management/communications common connecting device (U-BS), and this change is registered in the U-BS free/used table 48. When the released BS is judged to be a communications connecting device (C-BS) in step ST168, is freed up after being changed to a management/communications common connecting device (U-BS) in step ST170, and this change is registered in the C-BS free/used table 31 and the U-BS free/used table 48.

Needless to say that "Z" signs in FIG. 32 show the merger of a skipping flow.

The free-up results obtained in steps ST163, ST166, ST169 and ST170 are compiled in step ST171. Then, the invoker's process is reinstated in step ST172.

Returning to FIG. 31, a C-BS released in step ST153 may not be freed up as a U-BS, as explained in the description of FIG. 32, it is judged in step ST154 whether the released C-BS is freed up as a U-BS or a C-BS. When it is judged to be freed up as a U-BS in step ST154, the BS mode in the BS packaging table 25 is changed to the U-BS mode in step ST155 and a change notification to the U-BS is compiled in step ST156. When it is judged to be freed up as a C-BS in step ST154, steps ST155 and ST156 are skipped.

Then, the BS free-up information is compiled in step ST157, and the channel controller 22 is invoked in step ST158. The channel controller 22 emits the free-up information to the BS in step ST159, thereby notifying the BS of the conversion to a U-BS.

Figure 33:
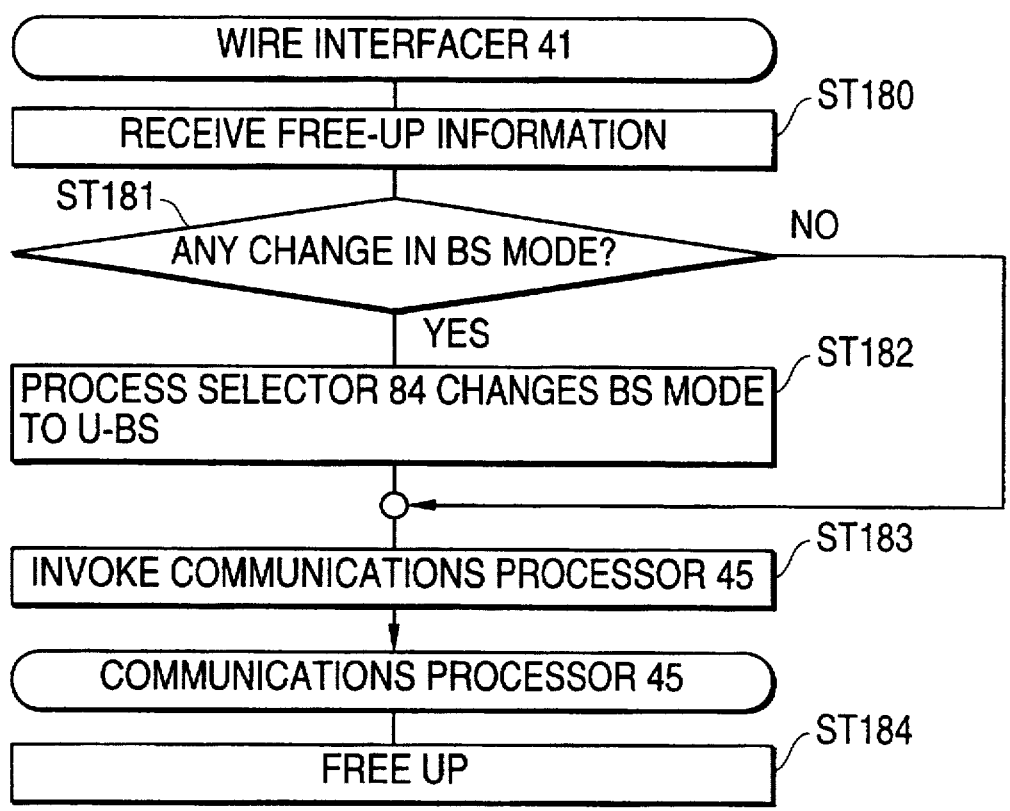
FIG. 33 is a flowchart showing the operations of a connecting device (BS) on receiving a free-up information.

FIG. 33 is a flowchart showing the operations of a connecting device (BS) on receiving a free-up information.

When the wire interfacer 41 receives free-up information from the channel controller 22 thus invoked in step ST180, it judges whether the free-up information contains any change in the BS mode in step ST181. When there is in fact a change, the process selector 84 changes the BS mode to the U-BS in step ST182, otherwise the process in step ST182 is skipped. Then, the communications processor 45 is invoked in step ST183, and the communications processor 45 frees up the BS.

As explained above, this invention enables a management connecting device to be temporarily used for communications, when all communications connecting devices in a zone are used, thereby economizing equipment. As long as a free connecting device is available in a zone, the positions of mobile terminals can be tracked. Also, because this invention allows a parallel use of both a zone prioritizing communications and a zone prioritizing position management, this invention enables a system to optimize equipment economy and serviceability.

In addition, this invention prevents an overload caused by mobile terminals moving in concentration timewise and spacewise, which securely perform their call receptions, thereby producing an advantage of reducing failures in call connections (call losses).

What is claimed is:

1. A mobile radio telephone system operating in a plurality of zones and using a management connecting device as an additional communications connecting device, comprising:

a predetermined number P of mobile terminals provided in each of said plurality of zones;

a predetermined number Q of communications connecting devices, provided in each of said plurality of zones, each for establishing a call generated from one of the mobile terminals over a control channel and for switching the control channel to a communications channel to communicate with said one mobile terminal in a wireless connection;

a management connecting device, provided in each of said plurality of zones separately from said predetermined number Q of communications connecting devices, for recognizing P mobile terminals entering and leaving the zone; and controlling means for switching said management connecting device to operate as an additional communications connecting device in one of said zones if one of said P mobile terminals generates a connecting request in said one zone and all Q of said communications connecting devices are already assigned to the remaining said P mobile terminals, such that if the management connecting device is operating as an additional communications connecting device and subsequently a communications connecting device is released from communication followed by a mobile terminal generating a connecting request, the communications connecting device released from communication will communicate with the mobile terminal generating the connecting request, and such that the management connecting device does not recognize mobile terminals entering and leaving the zone when the management connecting device operates as an additional communications connecting device.

2. The mobile radio telephone system according to claim 1, wherein said communications connecting devices and said management connecting device each comprise:

communications processing means for controlling communications with each of said mobile terminals;

management processing means for managing communications among all of said mobile terminals; and process selecting means for selecting one of said communications processing means and said management processing means such that said communications processing means operates as a communications connecting device when selected by said process selecting means and said management processing means operates as a management connecting device when selected by said process selecting means.

3. The mobile radio telephone system according to claim 2, wherein said controlling means switches one of said communications connecting devices to said management connecting device when said one of said communications connecting devices completes its communications with one of said mobile terminals.

4. The mobile radio telephone system according to claim 2, wherein said controlling means includes a zone-specific table including information used to (a) control a switching of said management connecting device to said additional communications connecting device and (b) control the operation of said management connecting device as said additional communications connecting device.

5. A plurality of management/communications common connecting devices connected to a switch, each of said plurality of management/communications common connecting devices comprising:

management processing means for managing a position of a movable terminal unit via said switch;

a plurality of communications processing means connected to said switch for performing communications with a movable terminal unit via said switch; and selecting means for selecting said management processing means to operate as said communications processing means when all communications processing means connected to said switch are determined to be in use and for selecting one of said communications processing means to operate as said management processing means to manage the position of the moveable terminal unit via said switch, if one of said communications processing means is released from communications while said management processing means is operating as said communication processing means.

* * * * *